United States Patent
Yew et al.

(10) Patent No.: US 7,499,425 B2
(45) Date of Patent: Mar. 3, 2009

(54) METHODS FOR ENSURING MEDIUM ACCESS IN A WIRELESS NETWORK

(75) Inventors: Tan Pek Yew, Singapore (SG); Wei Lih Lim, Singapore (SG); Shinichiro Ohmi, Osaka (JP); Yasuo Harada, Hyogo (JP)

(73) Assignee: Panasonic Corporation, Osaka (JP)

( * ) Notice: Subject to any disclaimer, the term of this patent is extended or adjusted under 35 U.S.C. 154(b) by 1026 days.

(21) Appl. No.: 10/290,185

(22) Filed: Nov. 8, 2002

(65) Prior Publication Data

US 2003/0108059 A1 Jun. 12, 2003

(30) Foreign Application Priority Data

Nov. 9, 2001 (JP) .............................. 2001-344347

(51) Int. Cl.
*H04Q 7/00* (2006.01)

(52) U.S. Cl. ...................................... 370/329; 455/464

(58) Field of Classification Search ................ 370/335, 370/442, 347, 338, 319, 337, 346
See application file for complete search history.

(56) References Cited

U.S. PATENT DOCUMENTS

| | | | | |
|---|---|---|---|---|
| 5,142,533 A * | 8/1992 | Crisler et al. | ............... | 370/349 |
| 5,274,841 A | 12/1993 | Natarajan et al. | ........... | 370/337 |
| 5,297,144 A | 3/1994 | Gilbert et al. | ................ | 370/346 |
| 5,677,909 A | 10/1997 | Heide | ......................... | 370/347 |
| 5,970,062 A | 10/1999 | Bauchot | | |
| 6,097,707 A * | 8/2000 | Hodzic et al. | ............... | 370/321 |
| 6,327,254 B1 * | 12/2001 | Chuah | ......................... | 370/328 |
| 6,370,123 B1 * | 4/2002 | Woo | ............................. | 370/278 |
| 6,430,172 B1 | 8/2002 | Usui et al. | | |
| 6,747,968 B1 | 6/2004 | Seppälä | ...................... | 370/338 |
| 7,024,469 B1 * | 4/2006 | Chang et al. | ................ | 709/220 |
| 7,068,633 B1 * | 6/2006 | Ho | ............................. | 370/338 |
| 2002/0075891 A1 * | 6/2002 | Souissi | ...................... | 370/442 |
| 2003/0026286 A1 | 2/2003 | Nakamura | .................. | 370/442 |

FOREIGN PATENT DOCUMENTS

| | | |
|---|---|---|
| EP | 0483546 | 5/1992 |
| EP | 1117211 | 7/2001 |
| EP | 1289204 | 3/2003 |
| JP | 10-070554 | 3/1998 |
| JP | 11-74886 | 3/1999 |

OTHER PUBLICATIONS

R. Gubbi: "Isochronous Services in Home Multimedia Networks," IEEE Pacific RIM Conference on Aug. 22-24, 1999.
English language Abstract of JP 10-070554.
English language Abstract of JP 11-74886.

* cited by examiner

*Primary Examiner*—Edan Orgad
*Assistant Examiner*—Blanche Wong
(74) *Attorney, Agent, or Firm*—Greenblum & Bernstein, P.L.C.

(57) ABSTRACT

An efficient medium dedication schedule is generated. The schedule gives wireless medium an ability to concurrently serve real-time and non real-time application and still be able to maintain the Quality of Service as requested by the real-time application. Furthermore, QoS registration request is delivered in a time bound manner and a time slot is chosen for transmission during controlled contention phase that give lesser collision and higher throughput.

16 Claims, 20 Drawing Sheets

METHODS FOR ENSURING MEDIUM ACCESS IN A WIRELESS NETWORK

BACKGROUND OF THE INVENTION

1. Field of the Invention

This invention is related to access control of wireless medium used in streaming of time sensitive data such as real-time Audio-Visual data for interactive applications, communicative applications and gaming. In order to meet Quality of Service of the communication session set-up between mobile wireless terminals (or stations) and between access points or base stations and mobile terminals, a network layer that has control over an access mechanism need to aware on how the Quality of Service required for the session need to be served. The need to maintain service level for transmission of real-time data between access points and mobile terminals becomes increasingly as the number of mobile terminals and data traffic within the control of the access point increases.

2. Description of the Background Art

In some of wireless local area network (LAN) in compliance with IEEE 802.11, for example, it uses common wireless medium to exchange critical control and connection information (i.e. information on Quality of Service) between Station (STA) and the access point (AP). The control and connection information is exchanged in the form of management frames that happens periodically or on-demand depending on the data delivery requirement of the STA or the AP at any point in time. Critical and none critical data exchange between STA and AP is performed through contention of wireless medium. This makes predictability of critical data exchange difficult thus making real-time data streaming over the wireless medium almost impossible.

In most networks, Quality of Service provided for a data streams is largely handled at the Internet Protocol (IP) or application layers. In order to be more effective in assuring the Quality of Service for the data stream can be meet under all network conditions in a wireless network, it becomes necessary that the layer 2 (or medium access controller) whose responsibility is to manage accesses to the wireless medium has control over access mechanism. In the present invention, the purpose is to offer higher layer some control over how the Quality of Service of the data connection can be guaranteed.

The other problem, the present invention seeks to solve is the reduction of required delay bound faced by the medium access controller of the wireless medium. In most real-time audio-visual delivery, persistence connection to the wireless medium is mandatory. In some cases, the time for which audio-visual data is held by the Medium Access Controller (MAC) must be constant and must be within a specific time. If the holding of the real-time data exceed the maximum time for which the data is allowed to stay in the MAC layer, the real-time delivery characteristic required is no longer meet the criteria.

In some of the wireless networks, medium access is largely based on data streams pumped from upper layers to the MAC layer in an ad-hoc basis. Assignment of wireless medium access in most cases follows an ad-hoc basis. For real-time critical data streams, there are needs to have a guaranteed time slot for the wireless medium access such that the data packets from the data streams can be delivered in a timely fashion. This invention provides a mechanism to allow upper register data streams with the MAC layer such that the medium access time can be guaranteed for the delivery of the data streams.

In the process of contending for wireless medium for all data stream delivery using prior art, both management and user data used the same medium access channel. This increases probability of having a collision in the wireless medium as the number of station controlled by the central access point increases. The present invention provides a different channel for station to contend for the right to register a data stream an exclusive time slot for the registered data stream delivery. The present art further provides a dynamic mechanism to allocate time slots for station to contend for registration of data stream for exclusive channels. Using a separate time slot for different data exchange, it provides a better bandwidth allocation for control data exchange between the central access point and the stations.

In the prior art, data delivery from the upper layers will contend for wireless medium and wasted a large amount of bandwidth on collision. The present invention allows data streams from the upper layers to have connection-oriented features in the wireless packet network.

SUMMARY OF THE INVENTION

The present invention solve the above problem by allowing data streams requiring specific level of service by specifying the bandwidth, latency, jitter and the period of occurrence of the 3 preceding parameters at it's marked maximum value to be requested to the medium access layer. The medium access layer whose main responsibility is to manage access to the wireless medium will based on these parameters to allocate the medium access time slot. Allocation of the time slots for wireless medium access is handled by the central coordinator (i.e. medium coordinator). The mechanism to carry allocation is usually implemented in the access point. The station requesting for a data connection with the central coordinator need to contend with other stations within a specific time slot for the transmission of the specific service level. The service levels requested by the station for the transmission of the data streams are then determined by the central coordinator and the final allocation are transmitted to the requesting station. Once the registration of a data connection based on the service level requested, the coordinator would periodically allocate bandwidth for the requesting station to transmit data.

More specifically, according to the present invention, a method for registering a transmission request in response to a reception of a QoS registration request for transmitting data stream with a predetermined quality secured is provided. The QoS registration request is received from a station transmitting the data stream via wireless medium.

The first method includes:

transmitting a control frame to a station at a contention control phase to control contention between a plurality of stations, the control frame representing acceptance of a reservation request for the wireless medium;

receiving the reservation request from the station at the contention control phase;

in the case that reception of the reservation request from the station is successful, polling the station at a non-QoS phase during which the data stream is transmitted with unsecured quality and which is different from the contention control phase;

receiving, at the non-QoS phase, the QoS registration request from the station who responded to the polling, the QoS registration request representing requirements that are necessary at the QoS phase during which the data stream is transmitted with the predetermined quality secured;

determining whether transmission subject to the requirements is granted or not based on a condition available for the wireless medium;

in the case that the transmission subject to the requirements is granted, registering, at the non-QoS phase, the station and the requirements.

Furthermore, the second method includes:

at a contention-based phase during which each of a plurality of stations transmits its data stream by determining whether transmission is possible or not, receiving the QoS registration request from the station, the QoS registration request representing requirements that are necessary at the QoS phase during which the data stream is transmitted with the predetermined quality secured;

determining whether the transmission subject to the requirements is granted or not based on a condition available for the wireless medium;

in the case that the transmission subject to the requirements is granted, registering, at the contention-based phase, the station and the requirements.

The third method includes:

at a contention-based phase during which each of a plurality of stations transmits its data stream by determining whether transmission is possible or not, receiving a polling request from the station, polling the station at a non-QoS phase during which the data stream is transmitted with unsecured quality and which is different from the contention-based phase;

receiving, at the non-QoS phase, the QoS registration request from the station who responded to the polling, the QoS registration request representing requirements that are necessary at the QoS phase during which the data stream is transmitted with the predetermined quality secured;

determining whether the transmission subject to the requirements is granted or not based on a condition available for the wireless medium;

in the case that the transmission subject to the requirements is granted, registering, at the non-QoS phase, the station and the requirements.

The present invention make use parametric description to quantify network access (medium access) service level required for delivering a data stream over a wireless medium. Based on the connection request using the parametric description, upper network layers can communicate it's network connection requirement with the medium access controller such that wireless medium access can be guaranteed over specific duration of time. The present invention also provides mechanism to schedule different time slots for wireless medium access for user data and crucial control data. To further reduce the likelihood of long period contention, a variable time slots for control data is being adopted to improves the delay.

With the employment of the presented invention, real-time and non real-time application can be concurrently being served as well as maintain the QoS as requested by real-time application. Furthermore, the presented invention also cause QoS registration request to be delivered without contention and be able to reach Access Point (AP) at more timely fashion than prior act. The net effect of present invention is it allows wireless medium delay faced by a data stream to be reduced and much more predictable as the number of Stations within the AP increases. This invention allows a scalable approach in determining the type of AP can be implemented in terms of number of Stations the AP can support.

BRIEF DESCRIPTION OF THE DRAWINGS

This and other objects and features of the present invention will become clear from the subsequent description of a preferred embodiment thereof made with reference to the accompanying drawings, in which like parts are designated by like reference numerals and in which.

DETAILED DESCRIPTION OF THE PREFERRED EMBODIMENTS

Figure 9:
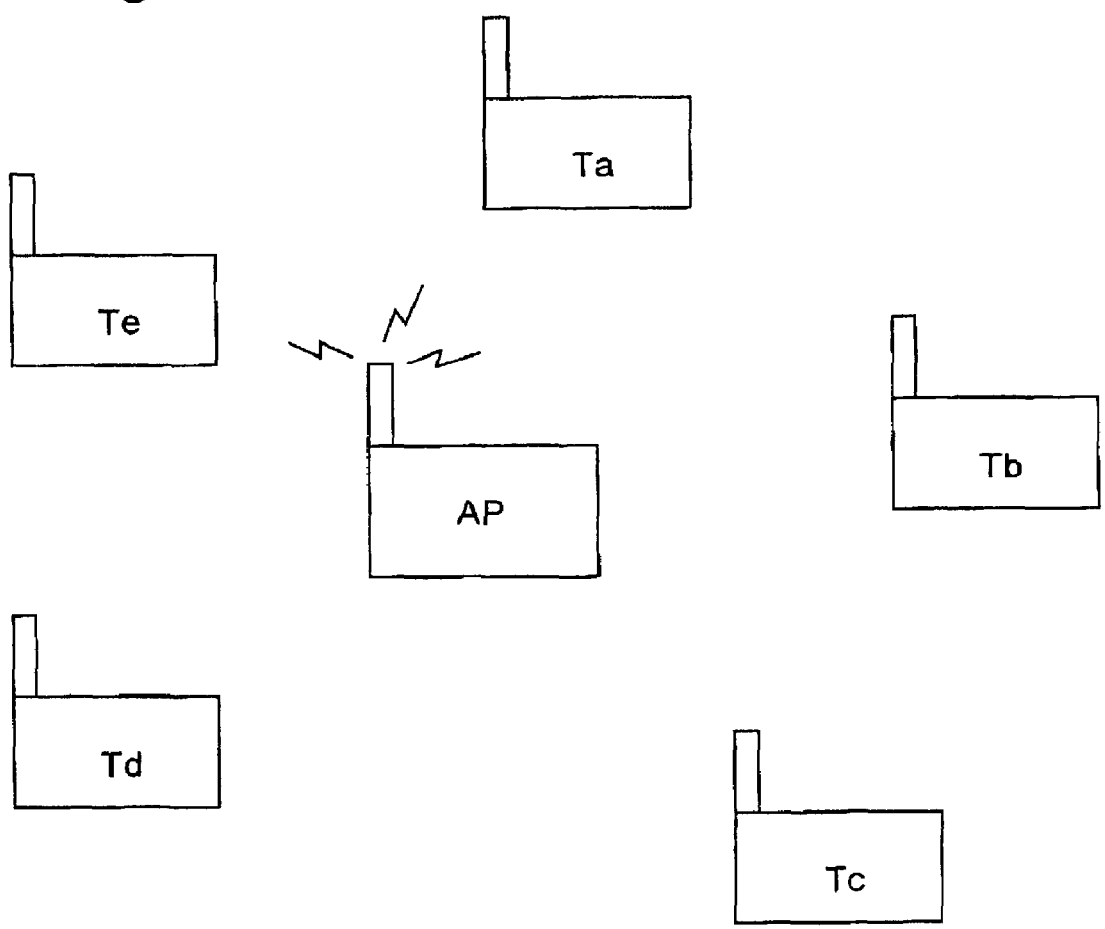
FIG. 9 is a diagram showing a system of wireless local area network (LAN)

In the following embodiments, a system of wireless local area network (LAN) as shown in FIG. 9 will be described. This system includes an access point AP as a main station, and a plurality of stations Ta, Tb, Tc, Td, Te as ambient stations. The data is sent from any one of access point AP and stations Ta, Tb, Tc, Td, and Te to another station. When signals are simultaneously transmitted from a plurality of stations via wireless medium, collision of signals occurs. Therefore, access point AP, main station, receives transmission requests from stations, decides priority for dedicating wireless medium, and schedules in such a manner that transmission is carried out in the order in accordance with the priority. In this sense, access point AP is also called "medium coordinator." In the requests for transmission from stations, information concerning quality of transmission signal is also included so that data rate or transmission scheme that agrees with the desired quality would be granted.

Note that access point AP is a station having functions described below. In other words, each of stations Ta to Te with the function may become access point AP.

The generic name of technique that controls transmission quality of network provided to user terminals is called Quality of Service (QoS). QoS may indicate services for controlling the transmission quality using this kind of techniques. Examples of parameters affecting the transmission quality include fluctuations (variations) of latency, data loss ratio, peak data rate, etc. Even when these are coordinated and traffic is concentrated within a network, a specified throughput can be secured per application, such as video transmission, voice transmission, etc., with QoS requirements being guaranteed.

Figure 10:
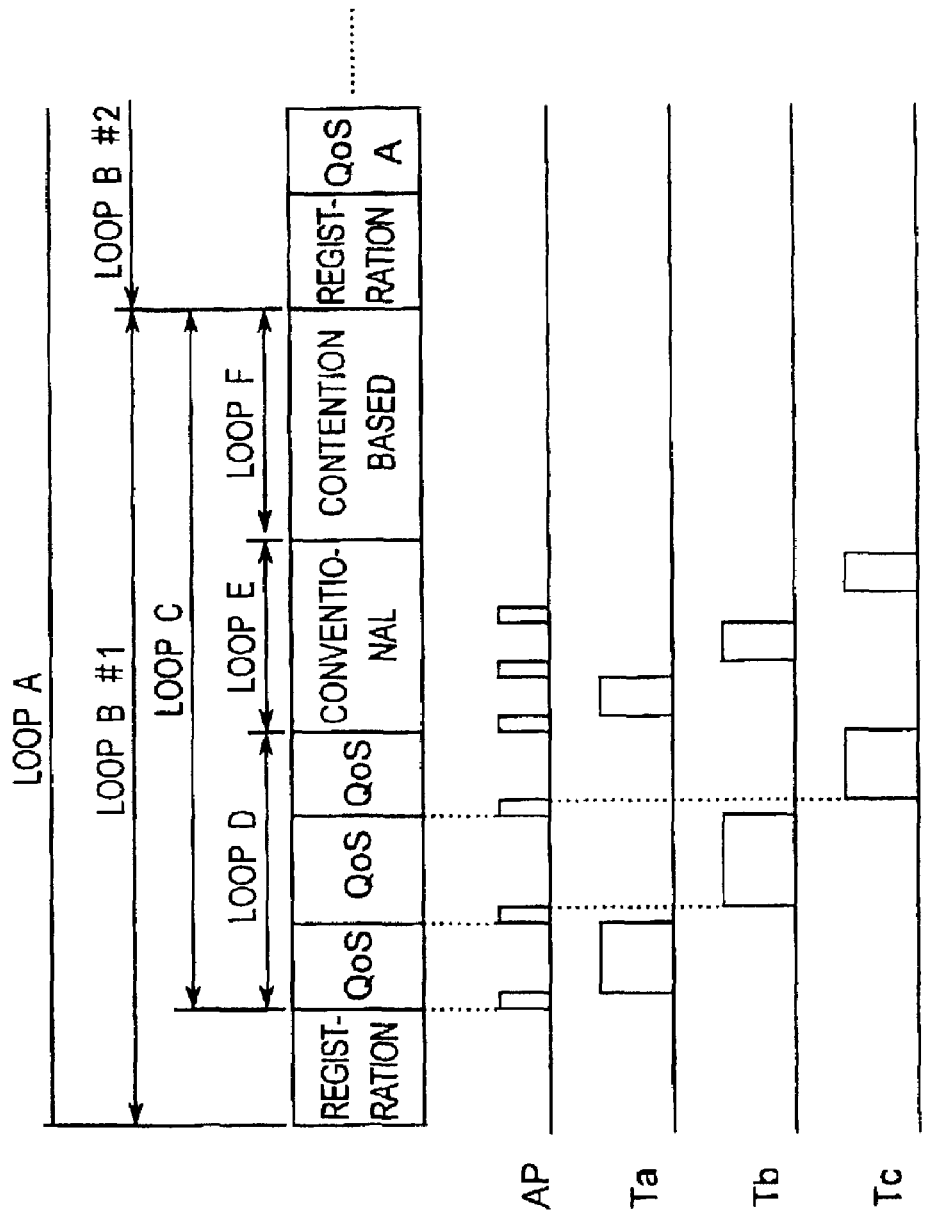
FIG. 10 is a diagram showing overall operation of wireless data communication according to the present invention.

FIG. 10 shows overall operation of wireless data communication according to the present invention. In the phase shown as "registration" in the figure, access point AP receives "QoS registration request" which is a request of transmission with desired quality secured such as data rate, etc. from stations Ta through Te, and completes registration of stations according to the content of the request. This registration is called "QoS registration". In the figure, the phase of "registration" is shown to be different from QoS phase (loop D), transmission phase for a Conventional medium dedication scheme (loop E), and transmission phase for contention base (loop F). However, as described later, the "registration" phase may include the transmission phase for a conventional scheme (loop E) and/or transmission phase (loop F) for contention base.

In the following description, it is assumed that the one or more QoS requests have been registered when a phase indicated as "registration" is finished. The present invention relates to various techniques that carry out this QoS registration. In an example shown in FIG. 10, it is assumed that stations Ta, Tb, and Tc have completed their QoS registration. (This expression is also written as "have QoS registered", "is QoS registered" in the followings.) The details of QoS registration method are described referring to FIGS. 14 through 18. Upon completion of the QoS registration, in the phase with loop D indicated, data transmission from stations begins according to the schedule allocated by registration contents.

In the initial QoS phase of loop D, station Ta carries out transmission. At the beginning of QoS phase, access point AP carries out polling to station Ta and gives permission for transmission. Polling frame which access point AP issues within QoS phase is called QoS poll. On the receipt of QoS poll, station Ta transmits data. The data transmission carried out on the basis of QoS poll is called as "QoS transmission", whose transmission quality is guaranteed on the basis of registration content. QoS transmission is required for the data which must be reproduced in real time, for example, TV, radio, etc. The transmitted party is any of the stations other than itself (Ta), that is, access point AP, stations Tb, Tc, Td, or Te. In the second QoS phase of loop D, station Tb carried out transmission at a signal of similar QoS poll. In the third QoS phase, station Tc carries out transmission at a signal of similar QoS poll. In loop D, these three QoS phases are included. In FIG. 10, loop D is executed once but may be repeated in a plurality of times.

Then, periodical communication by polling by a conventional medium dedication scheme takes place. In the figure, the phase in which communication of the conventional medium dedication scheme is shown as loop E. Unlike QoS Poll, the poll issued by means of the conventional scheme is called non-QoS Poll. The data transmission carried out based on a non-QoS Poll is called non-QoS transmission. non-QoS transmission is utilized for the data to which stringent real-time constraints are not required, for example, text data, mail, etc. Non-QoS transmission is the same as QoS transmission in that each station has data transmission controlled by access point AP, but it differs from QoS transmission in that the transmission quality is not guaranteed. Both access point AS and stations can identify non-QoS poll from QoS-Poll. Loop E may be repeated in a plurality of times.

Next, contention-based transmission with no polling is carried out. In the figure, the phase in which the contention-based transmission is shown as loop F. In the contention-based transmission, communication is judged possible and the data is transmitted only in the event that transmission signal sent from any other stations is not detected for a specified time. Loop F may be repeated in a plurality of times. If required, access point AP may notify the start time and end time of contention-based communication to each station. According to such notification, each station has no need to perform such detection during the time other than the period. Thus, operation can be simplified.

Loop E or F may be provided or may not be provided. The sequence in which loops D, E, and F appear is the sequence specified at the time of registration, and loop E or loop F may appear at the top and loop D may appear at the second or the third.

Figure 3:
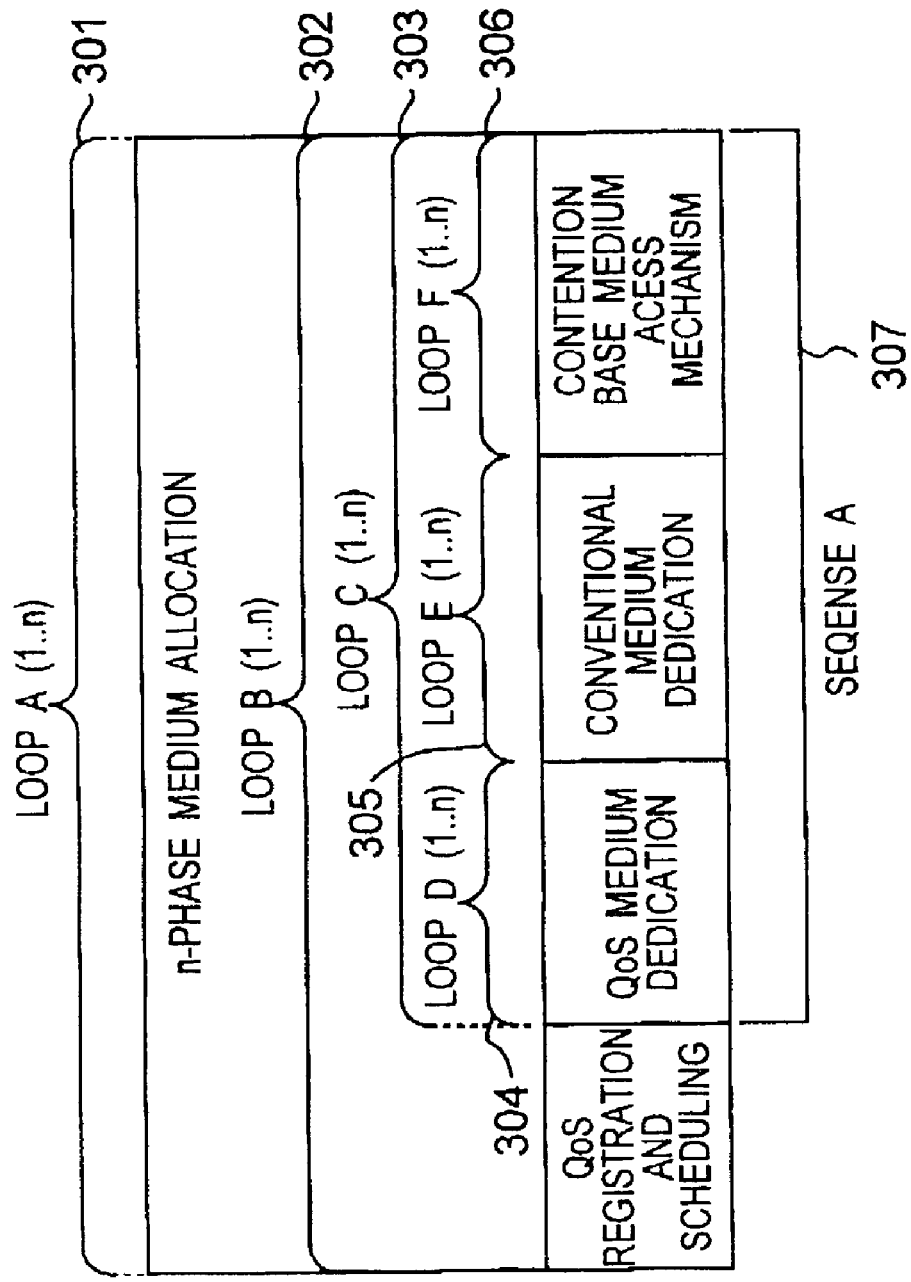
FIG. 3 is a flowchart of a repetition relationship for four sub tasks of 3-phase medium dedication.

Loops D, E, and F are altogether included in loop C. In addition, loop C together with registration phase are included in loop B. A loop collecting loop C is called loop A. FIG. 3 shows a hierarchical structure from loops A to F.

Figures 4A, 4B:
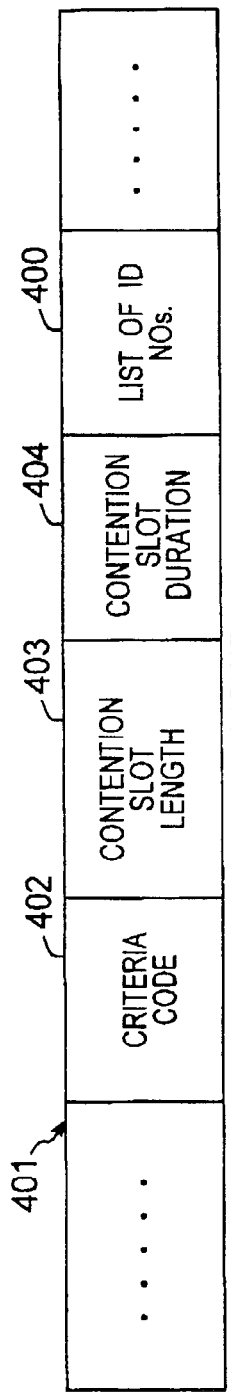
FIGS. 4A to 4D show frame formats for frame types being mentioned in the embodiments.
Figure 11:
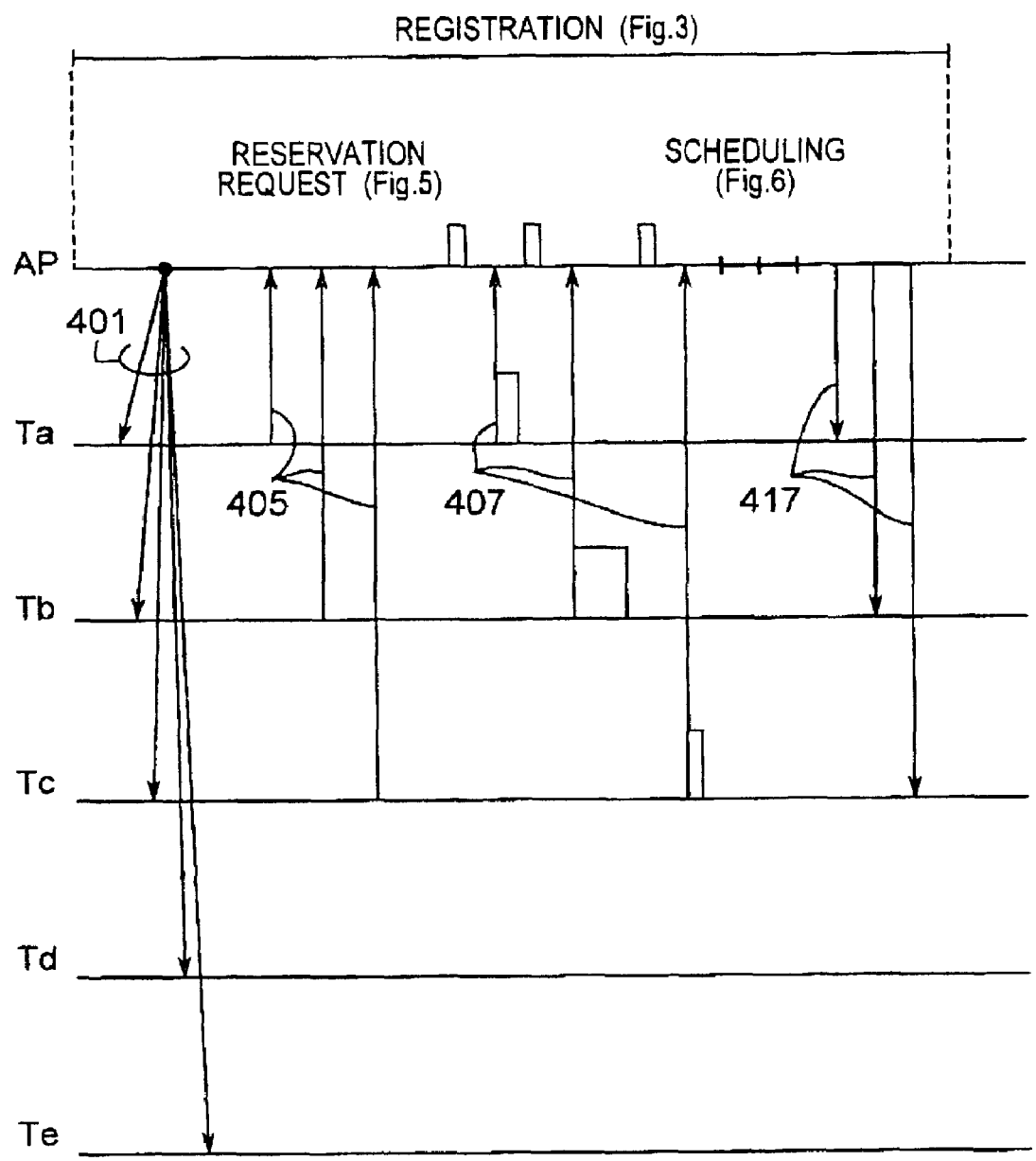
FIG. 11 is a diagram showing operation for QoS registration

FIG. 11 shows operation for QoS registration. After the beginning of registration procedures, access point AP transmits signal 401 (FIG. 4A) for asking whether a time slot for signal transmission should be reserved or not, that is, for accepting reservation to all the ambient stations. This operation is called Control Contention (CC). In a receipt of signal 401, corresponding stations which need to reserve time slot for transmission submit Reservation Request (RR) signal 405 (FIG. 4B). In the example shown in FIG. 11, shown is the case in which stations Ta, Tb, and Tc output reservation request signal 405 and station Td and Te output no reservation request signal. Operation to accept a reservation request is shown in a flow chart in FIG. 5.

Access point AP collects required information of stations concerning QoS registration in order to know how much quality is required for transmission or what system of transmission is required for a station that has made a reservation request RR. This request information is incorporated in QoS registration request frame 407 (FIG. 4C), and it is transmitted from reservation requesting station to access point AP in response to polling signal from access point AP.

Figure 6:
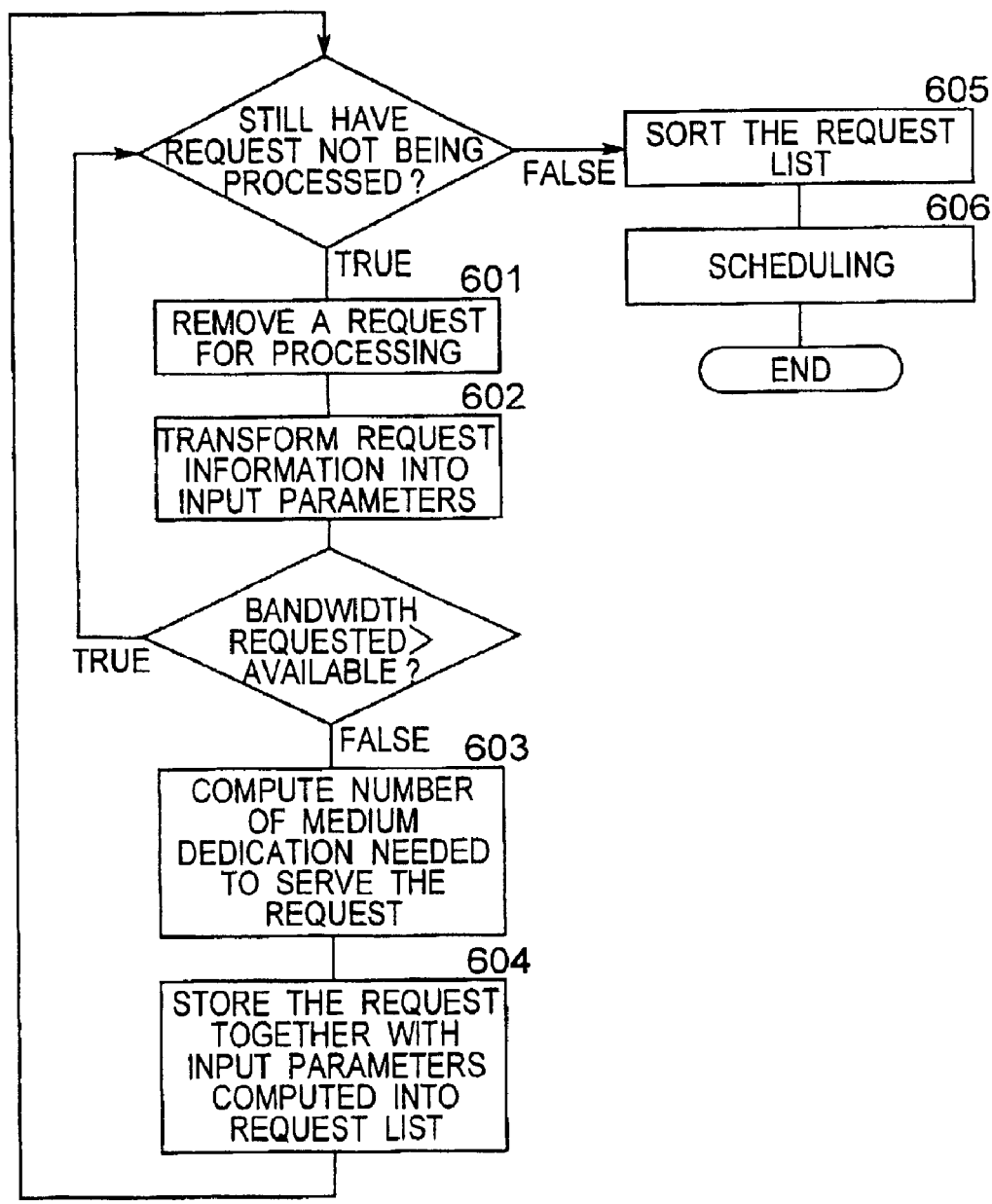
FIG. 6 is a flow chart of QoS reservation request conversion procedure. This figure shows operations for converting QoS reservation requests into request list, which is used as an input parameter for scheduler.
Figure 7:
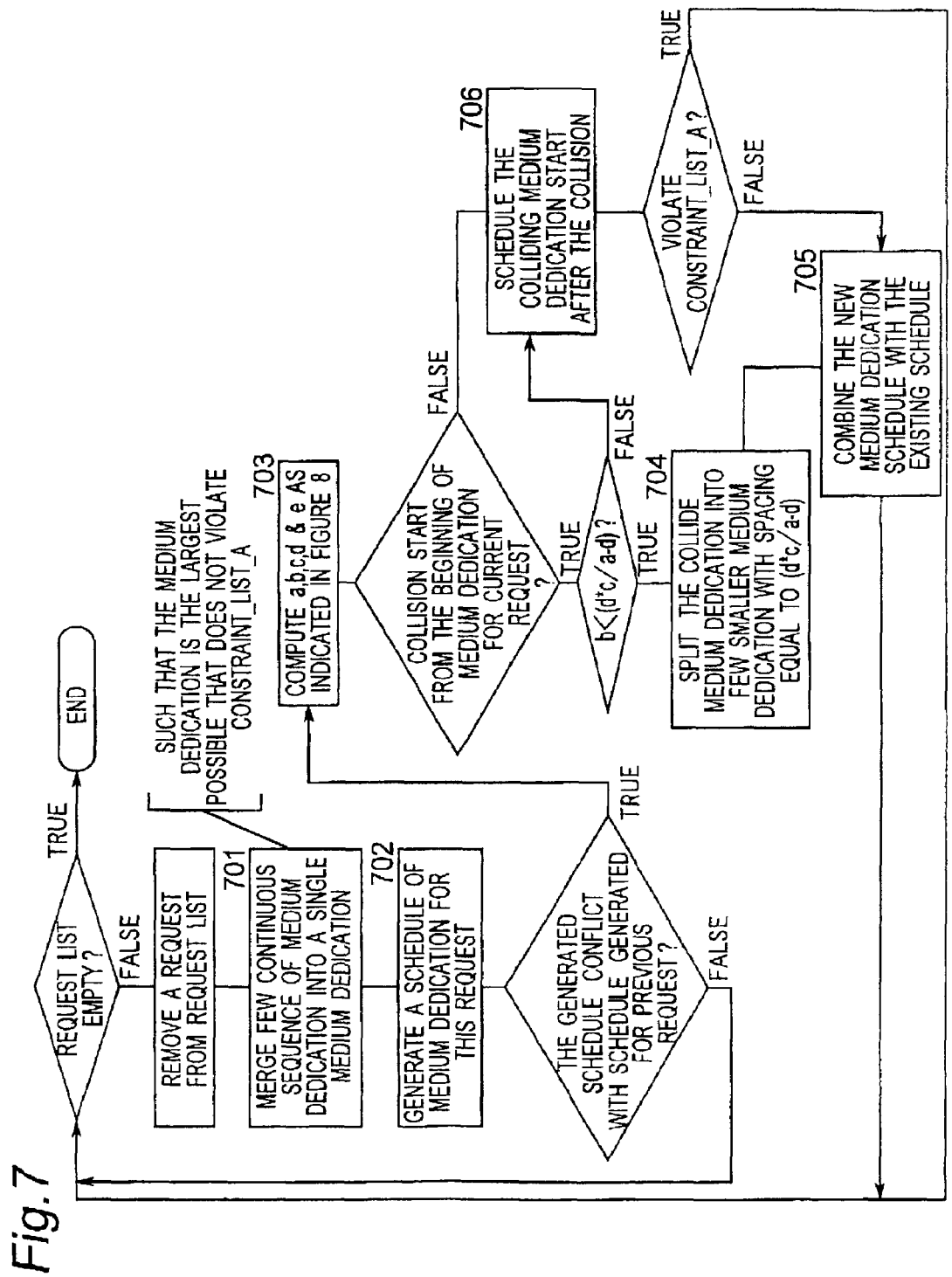
FIG. 7 is a flow chart of operation of a scheduler. This figure shows operations performed by the scheduler to generate a schedule for medium dedication base on request list.
Figure 8:
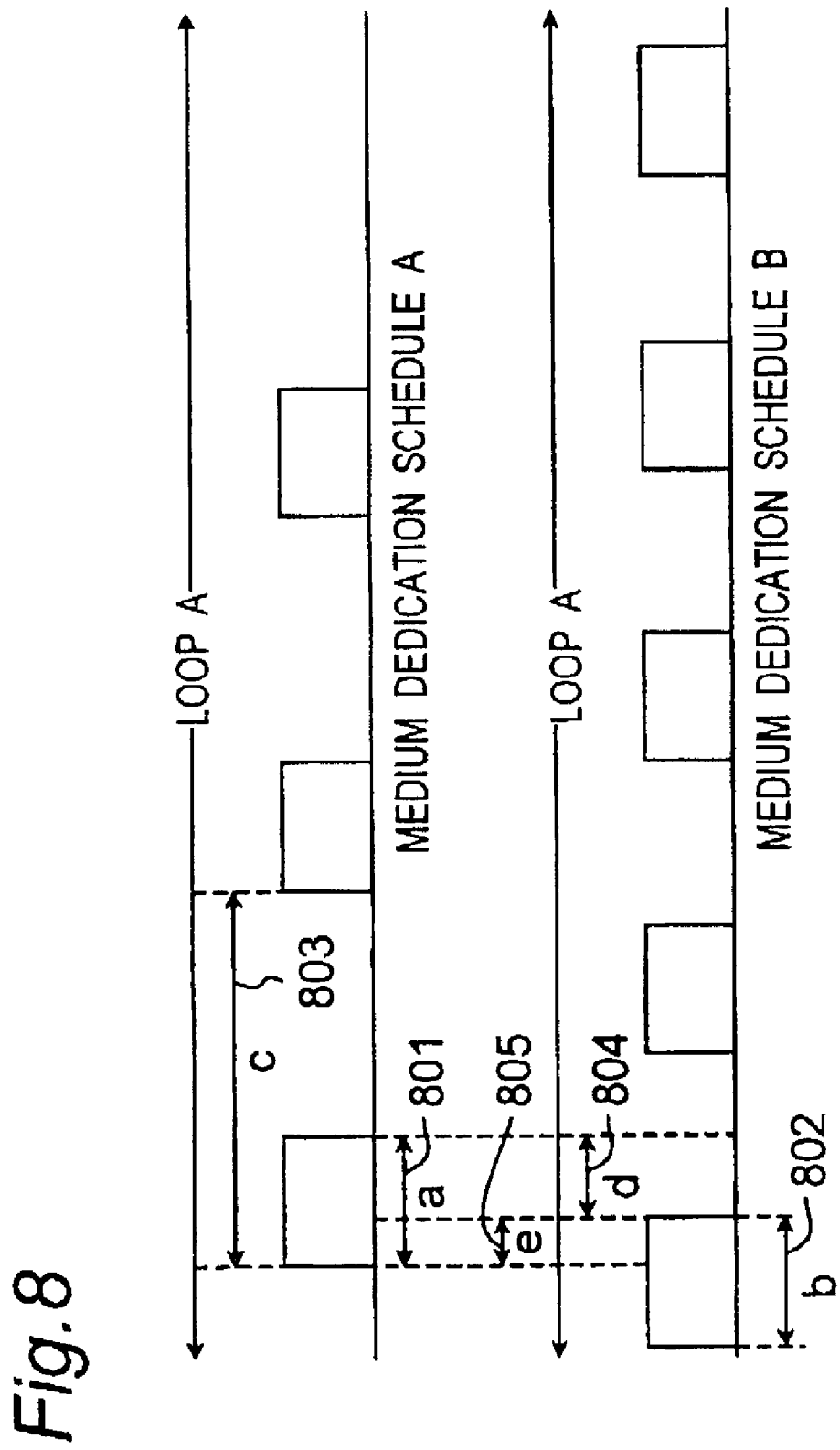
FIG. 8 is a diagram showing time relationships. This figure shows time duration representation in the case of merging two collided medium dedication schedules.

Access Point AP schedules in what contents and in what order transmission permit is given to reservation requesting stations Ta, Tb, and Tc. The flow chart of FIG. 6 shows the detail of this schedule preparation.

When the schedule is determined, access point AP transmits QoS reservation response frame 417 (FIG. 4D) to reservation requesting stations Ta, Tb, and Tc for confirmation. According to this operation, reservation requesting stations Ta, Tb, Tc recognize whether they have QoS registered or not. Thereafter, in the QoS phase of loop D (FIG. 10), reservation requesting stations Ta, Tb, and Tc carry out data transmission allocated based on QoS polls, respectively.

Figure 4C:
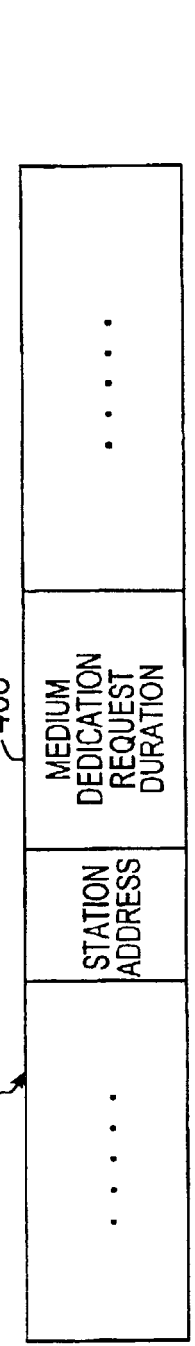
Figure 13A:
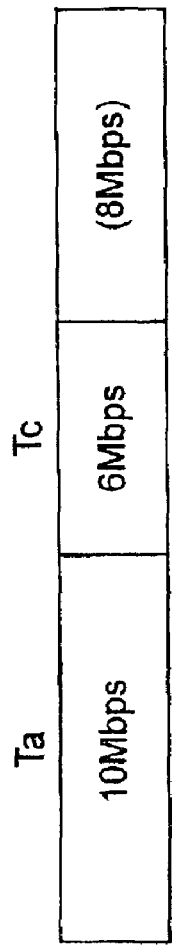
FIGS. 13A through 13C are diagrams showing specific examples of QoS registration with respect to bandwidth.
Figure 13B:
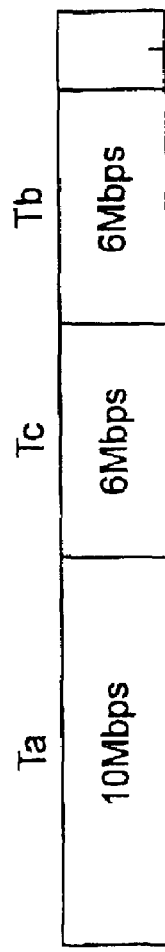
Figure 13C:
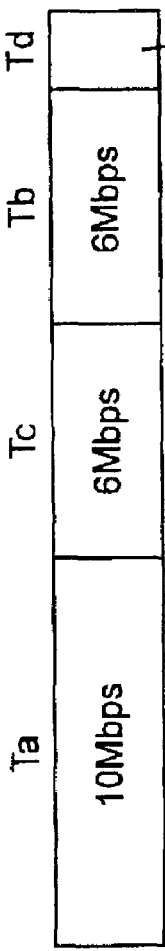
Figure 20A:
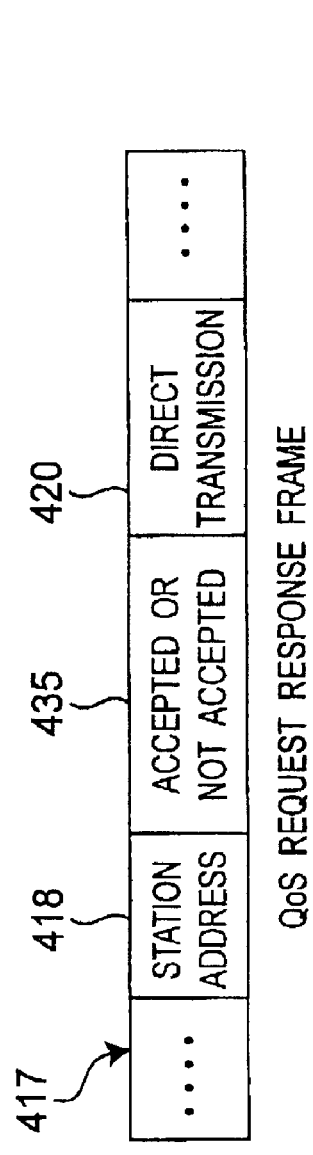
FIG. 20A is a diagram showing details of QoS request response frame format.
Figure 20B:
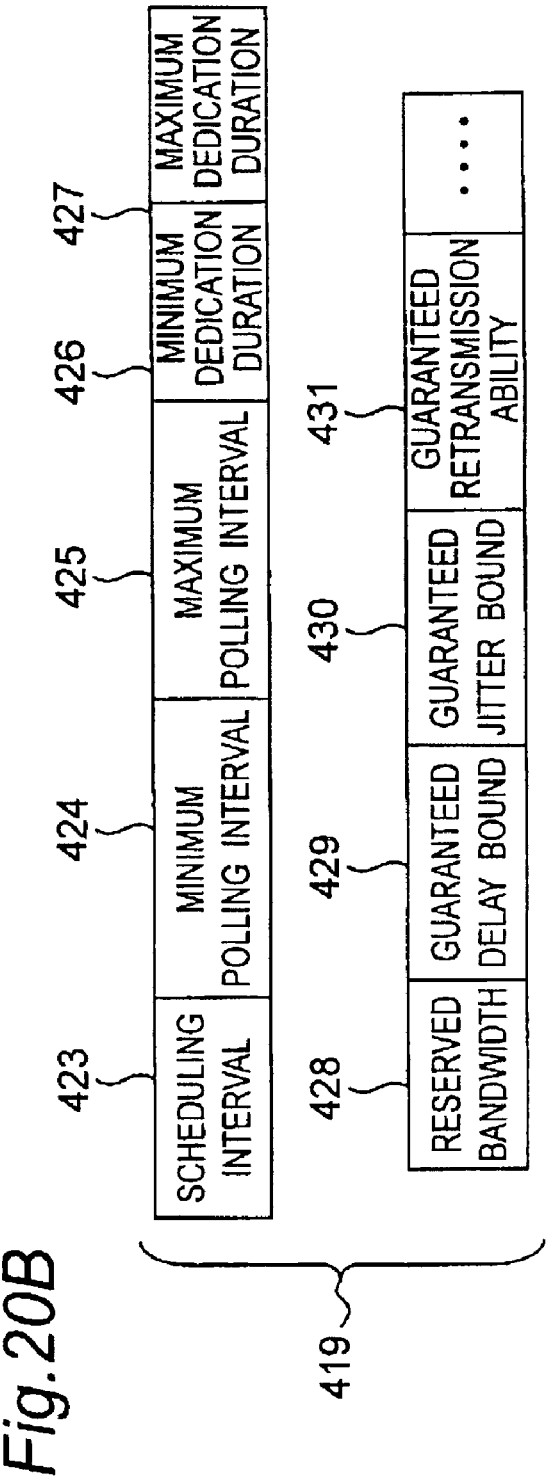
FIG. 20B is a diagram showing details of bandwidth allocation information frame format.

FIGS. 13A through 13C explain specific examples of QoS registration with respect to bandwidth. As shown in FIG. 13A, in a wireless medium whose usable bandwidth is 24 Mbps, it is assumed that stations Ta and Tc have already been QoS-registered and have been allowed for 10 Mbps and 6 Mbps QoS transmission, respectively. At this point, the remaining usable bandwidth is 8 Mbps. In FIG. 13B, station Tb newly provides reservation request RR and requests 6 Mbps QoS transmission using QoS registration request frame 407 (FIG. 4C). As a result, access point AP carries out QoS registration for station Tb with the allocated bandwidth set to 6 Mbps. The registered contents are described in QoS request response frame 417 (FIG. 4D) and transmitted to station Tb. In such event, the remaining usable bandwidth is 2 Mbps. FIG. 20B shows specific contents of bandwidth allocation information 419 contained in QoS request response frame 417.

FIG. 13C shows when another station Td further requests QoS transmission for 6 Mbps. Since the presently remaining usable bandwidth is 2 Mbps, access point AP cannot make a schedule by the request as it is. Consequently, access point AP transmits information indicating non-acceptance (upper column of FIG. 13C and parameter 435 of FIG. 20A). As a result, station Td recognizes that it has not QoS registered.

As an additional method, access point AP may transmit the information indicating the usable bandwidth (in this example, 2 Mbps) at the current point together with or in place of the information that indicated non-acceptance. When station Td receives the information indicating 2-Mbps bandwidth in spite of its request of 6 Mbps, it recognizes that QoS registration at 6 Mbps is not allowed and presently, 2 Mbps only can be used. If 2 Mbps bandwidth is accepted for station Td, Td requests 2 Mbps QoS transmission using QoS registration request frame 407 (FIG. 4C). As a result, access point AP allocate 2 Mbps bandwidth to station Td and carries out QoS registration (lower column of FIG. 13C).

Note that, expressions of FIGS. 13A through 13C do not mean that station Ta is permitted QoS transmission in the first place and after transmission of station Ta is finished, QoS transmission of station Tc is permitted, but simply shows schematically the bandwidth which is allowed to be used, In actuality, the sequence of QoS transmission of stations Ta through Td varies based on time, etc. Consequently, the data transmitted via a medium is transmitted with various data from each of stations Ta through Td interleaved. This concludes the description on a specific example of QoS registration.

Next description will be made on a specific procedure for carrying out QoS registration. In the present specification, five types of procedures are described. Specifically, 1. QoS registration using contention control (CC) and reservation request (RR) (FIG. 14);
2. QoS registration in the contention-based data transmission phase in the event that reservation request (RR) fails (FIG. 15);
3. QoS registration using non-QoS poll request when reservation request (RR) fails (FIG. 16);
4. QoS registration in contention-based data transmission phase without using reservation request (RR): (FIG. 17); and
5. QoS registration using non-QoS poll request without using reservation request (RR) (FIG. 18).

For simplifying the description, following explanation will be made in the case in which station Ta is QoS registered. For the description of registration procedures, "QoS registration" phase, "QoS transmission" phase, etc. will be referred suitably. In addition, numbers shown in following parentheses correspond to the numbers of five kinds of procedures shown above.

Figure 14:
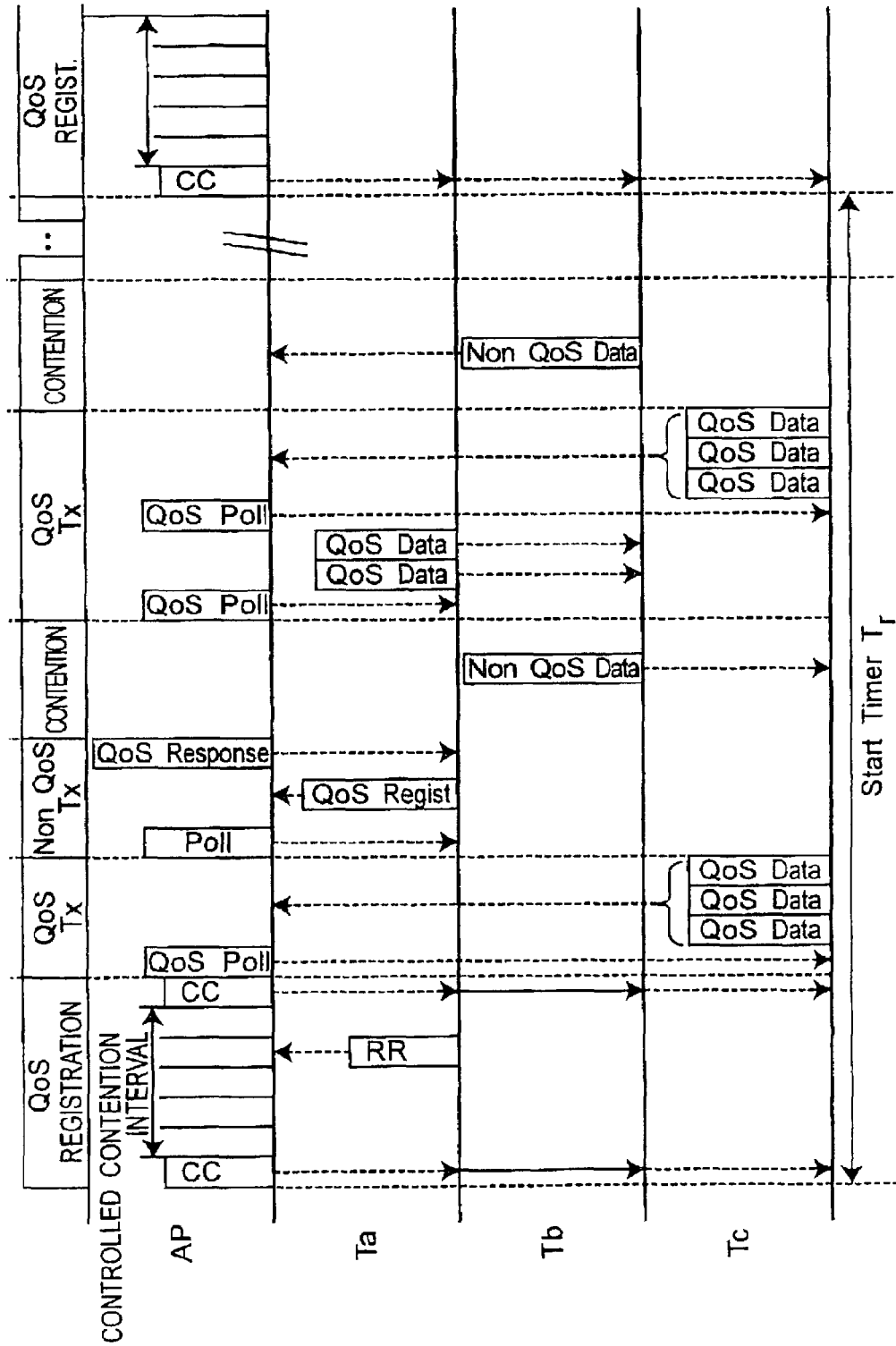
FIG. 14 is a diagram showing data transfer when QoS registration is carried out using contention control (CC) and reservation request (RR)

(1) QoS registration using contention control (CC) and reservation request (RR):

FIG. 14 is a diagram showing data transfer when QoS registration is carried out using contention control (CC) and reservation request (RR). First of all, access point AP carries out contention control (CC), in the QoS registration phase, for receiving one or more stations which desire QoS registration. Station Ta which desires QoS registration for transmitting a data stream to the QoS transmission phase responds to contention control (CC) and transmits a reservation request (RR) signal to access point AP within the duration of a predetermined contention control interval (for example, a few microseconds). The contention control interval is divided into slots of predetermined time lengths.

The transmission timing of reservation request (RR) signal is shown as follows. Access point AP controls a master clock and each station has a clock that synchronizes the master clock. When each station detects slot start time based on its clock, it transmits the reservation request (RR) signal at that time. Consequently, access point AP can easily determine whether a plurality of reservation request (RR) signals contend in a slot or not if it judges received signal(s) according to the slot start time. Note that, a slight margin may be provided for the time to receive the reservation request (RR) signal. In such event, access point AP judges whether it receives a plurality of reservation request (RR) signals or not within a range of a predetermined time width from the slot start time. Access point AP accepts the request when only one reservation request (RR) signal is received correctly in the time slot and does not accept the request when a plurality of reservation request (RR) signal collide and any RR can not be received correctly.

Access point AP again provides a contention control (CC) phase and transmits a control frame (FIG. 4A) to each station to notify each station as to whether the reservation request (RR) has been accepted or not. In control frame 401, a list 400 of identification numbers for identifying respective stations whose reservation request (RR) has been accepted is included. Stations can easily and quickly determines whether their reservation request (RR) have been accepted or not by referring to control frame 401. Note that, the contention slot length and contention slot phase of control frame 401 are set to 0 and the reservation request (RR) is not accepted.

In the next QoS transmission phase, there shown is a condition in which station Tc which has already been QoS registered is transmitting QoS data in accordance with QoS poll from access point AP.

Next, in the non-QoS transmission phase of a conventional scheme, access point AP carries out non-QoS poll to station Ta based on the previous reservation request (RR). This non- QoS poll means that access point AP gives station Ta an opportunity to transmit QoS parameters. The QoS parameters mean specific values desired to be registered and are transmitted using QoS registration request frame 407 of FIG. 4C. QoS registration request frame 407 may include minimum dedication duration and maximum dedication duration for polling interval 415, and furthermore, may include parameters such as additional bandwidth, maximum data speed, and delay bound (wait time).

Station Ta transmits QoS registration request frame ("QoS Regist." in FIG. 14) to access point AP when it receives non-QoS poll. Access point AP registers station Ta and the QoS parameters if the request described in the QoS registration request frame is acceptable based on a condition available for the wireless medium, and transmits the QoS request response frame ("QoS response" in FIG. 14) to station Ta. At this point, QoS-registration of station Ta is completed. Station Ta is given QoS poll from the next QoS transmission phase and can carry out QoS transmission.

Figure 4D:
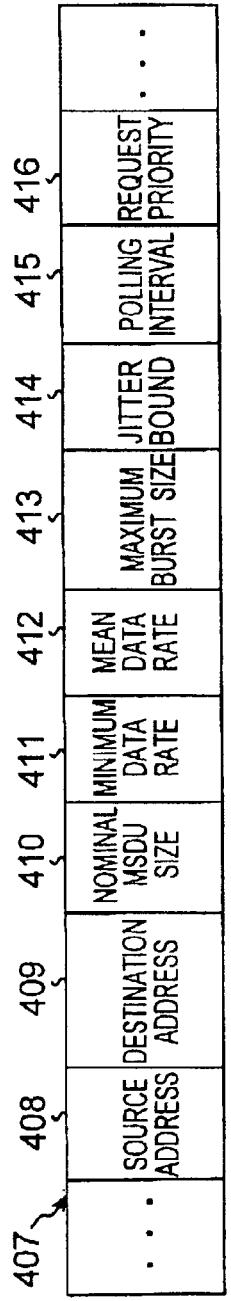

Now, description will be made on the QoS request response frame transmitted to station Ta. FIG. 4D is a diagram showing an example of QoS request response frame 417. QoS request response frame 417 includes information 418 for identifying an applicable station address, bandwidth allocation information 419, and information 420 that indicates the possibility of direct transmission. In bandwidth allocation information 419, a large number of information on the bandwidth given to station Ta is included. FIG. 20B is a diagram showing details of bandwidth allocation information 419. Bandwidth allocation information 419 includes scheduling interval 423, minimum/maximum polling intervals 424, 425, minimum/maximum dedication durations 426, 427, reserved bandwidth 428, guaranteed delay limit (bound) 429, guaranteed jitter limit (bound) 430, guaranteed retransmission ability 431, etc. Minimum/maximum polling intervals 424, 425 indicates the minimum and maximum intervals in which QoS poll is carried out for station Ta. In addition, minimum/maximum dedication durations 426, 427 indicate the minimum and maximum intervals in which a medium can be dedicated after QoS poll is received. These examples are described later as QoS_Regis_Parameter {}.

As described above, station Ta can learn the QoS-registered contents by referring to the bandwidth allocation information 419 in this way. The stations other than station Ta can learn that it is presently the QoS phase as well as the range of QoS poll phase by monitoring QoS poll to station Ta.

Next, procedures of different types of QoS registration will be described below, but in all the cases, the station can confirm the QoS-registered contents by referring to QoS request response frame 417 (particularly, bandwidth allocation information 419).

Figure 15:
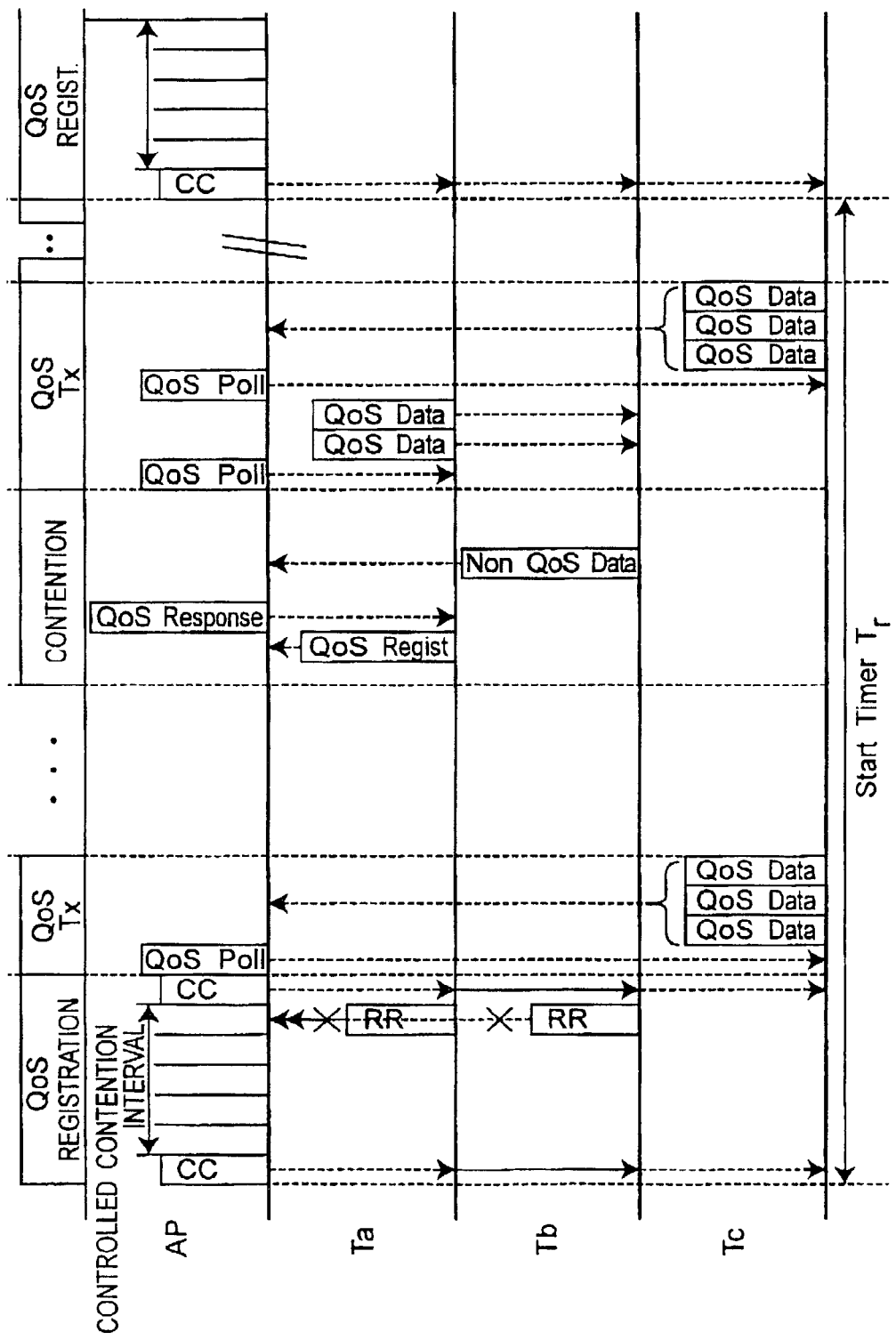
FIG. 15 is a diagram showing a data flow when QoS registration is carried out in the contention-based data transmission phase when reservation request (RR) fails.

(2) QoS registration in the contention-based data transmission phase in the event that reservation request (RR) fails:

FIG. 15 shows a data flow when QoS registration is carried out in the contention-based data transmission phase when reservation request (RR) fails. If a plurality of stations (station Ta and station Tb in the figure) in the same slot of contention control (CC) interval simultaneously transmit a reservation request (RR), access point AP does not accept either one of reservation request (RR). Consequently, station Ta is notified by the second contention control (CC) of QoS registration phase that the reservation request (RR) failed, and recognizes that reservation request (RR) has not been accepted.

Then, in the next contention-based data transmission phase, station Ta transmits QoS registration request frame ("QoS Regist" in FIG. 15) directly to access point AP. Access point AP analyzes QoS parameters which are described in the frame and requested by station Ta and determines whether the request is acceptable or not, based on a condition available for the wireless medium. If the request is acceptable, access point AP registers station Ta and the QoS parameters, and transmits QoS request response frame to station Ta. At this point, QoS registration for station Ta is finished. Station Ta is given QoS poll and is allowed to carry out QoS transmission.

Figure 16:
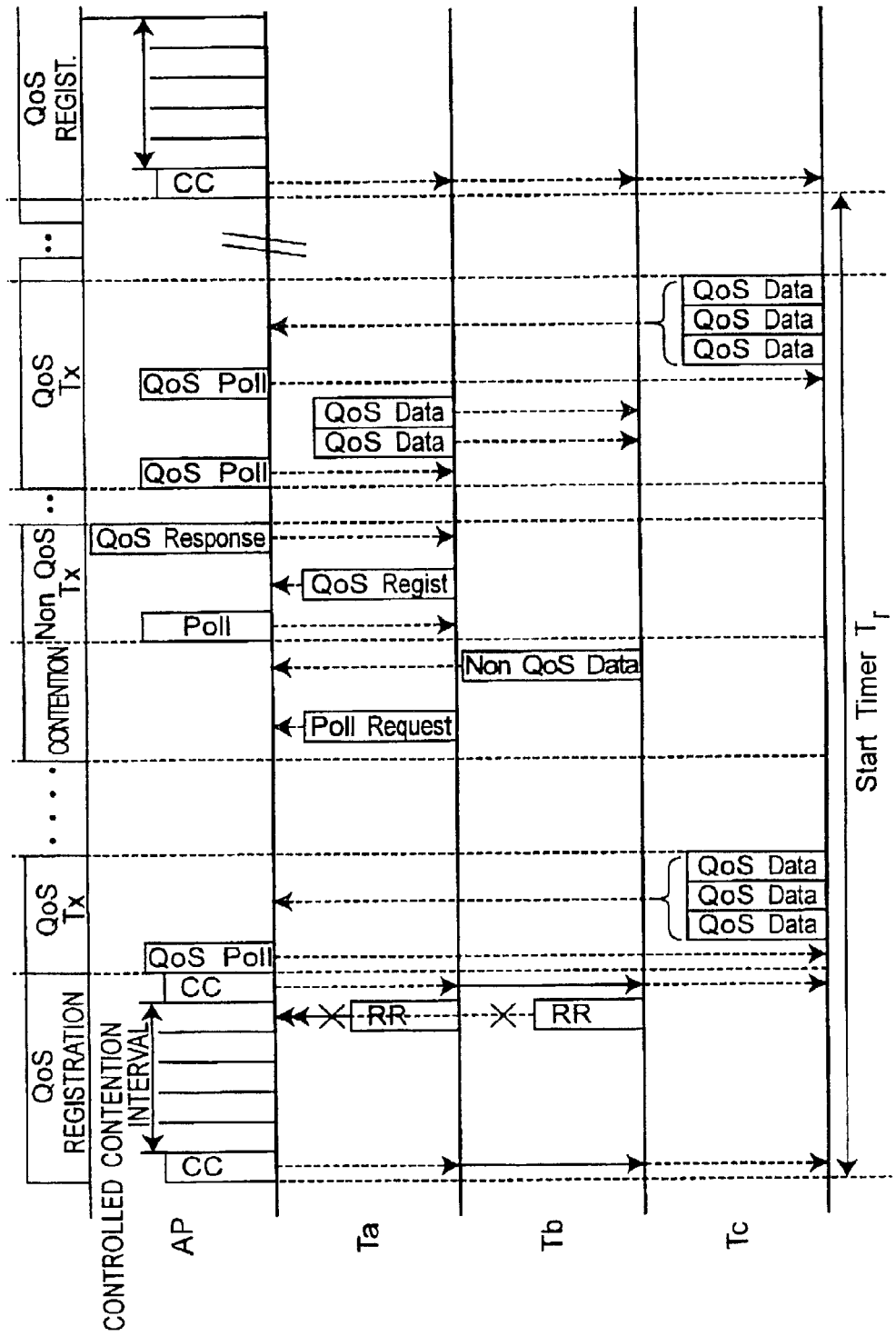
FIG. 16 is a diagram showing data transfer when QoS registration is carried out using a non-QoS poll request when reservation request (RR) fails.

(3) QoS registration using non-QoS poll request when reservation request (RR) fails:

FIG. 16 shows a diagram that indicates data transfer when QoS registration is carried out using a non-QoS poll request when reservation request (RR) fails. Same as procedure (2), the case in which station Ta recognizes that reservation request (RR) fails in the second contention control (CC) of QoS registration phase is discussed.

Station Ta transmits a request for non-QoS poll ("Poll Request" in FIG. 16) in the contention-base transmission phase thereafter.

Then, access point AP carries out non-QoS poll for station Ta in the subsequent non-QoS transmission phase and gives station Ta an opportunity of non-QoS data transmission. Station Ta transmits QoS registration request frame ("QoS Regist." of FIG. 16) to access point AP based on the non-QoS poll. Access point AP which receives the QoS registration request frame carries out the processing same as that described in Procedure (2), and if the request is acceptable based on a condition available for the wireless medium, access point AP registers station Ta and the QoS parameters, and transmits a QoS request response frame to station Ta. After station Ta is registered, station Ta can carry out QoS transmission according to reception of QoS poll from the next QoS transmission phase.

Figure 17:
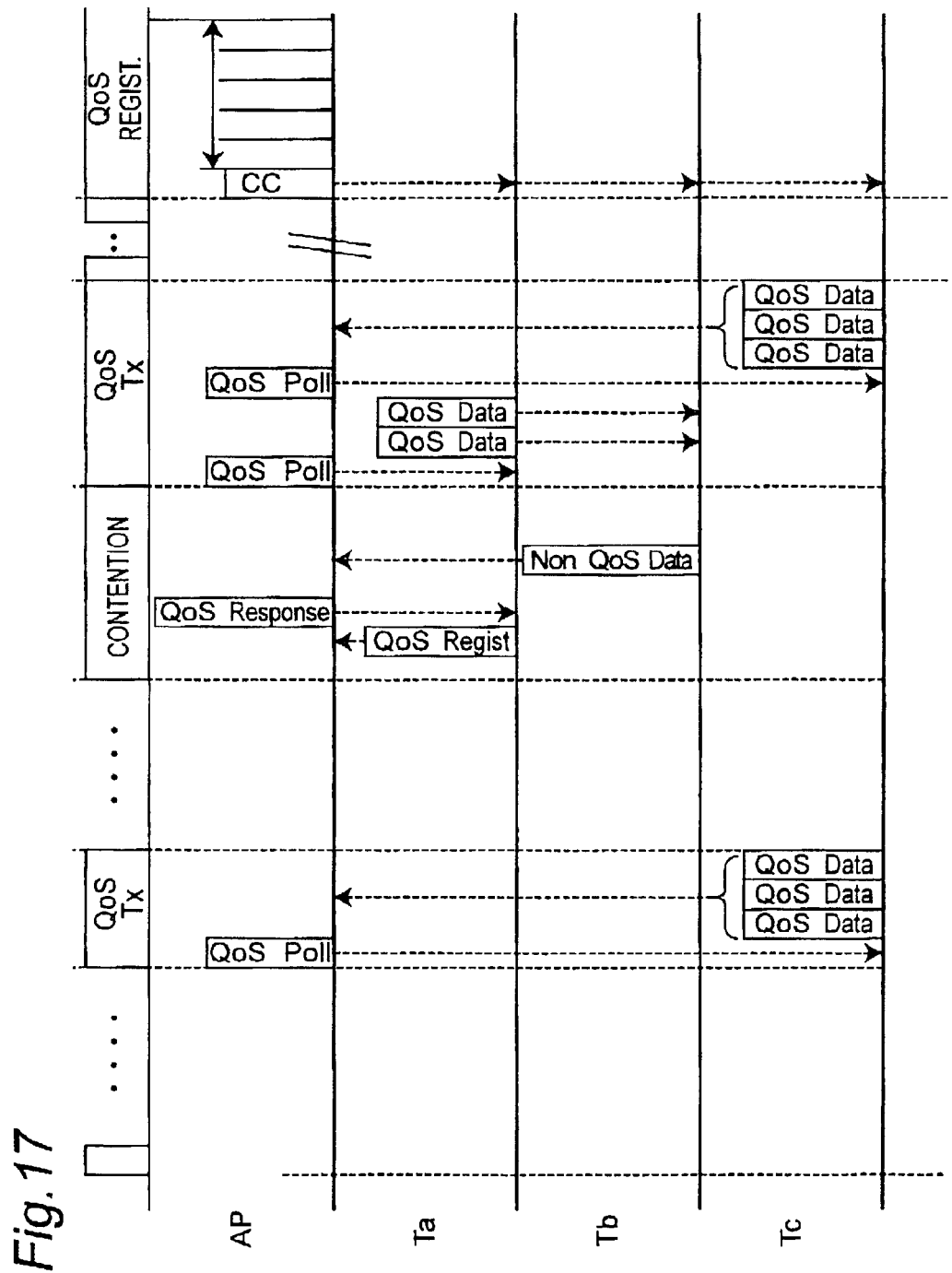
FIG. 17 is a diagram showing data transfer when QoS registration is carried out only within a contention-based transmission phase.
Figure 18:
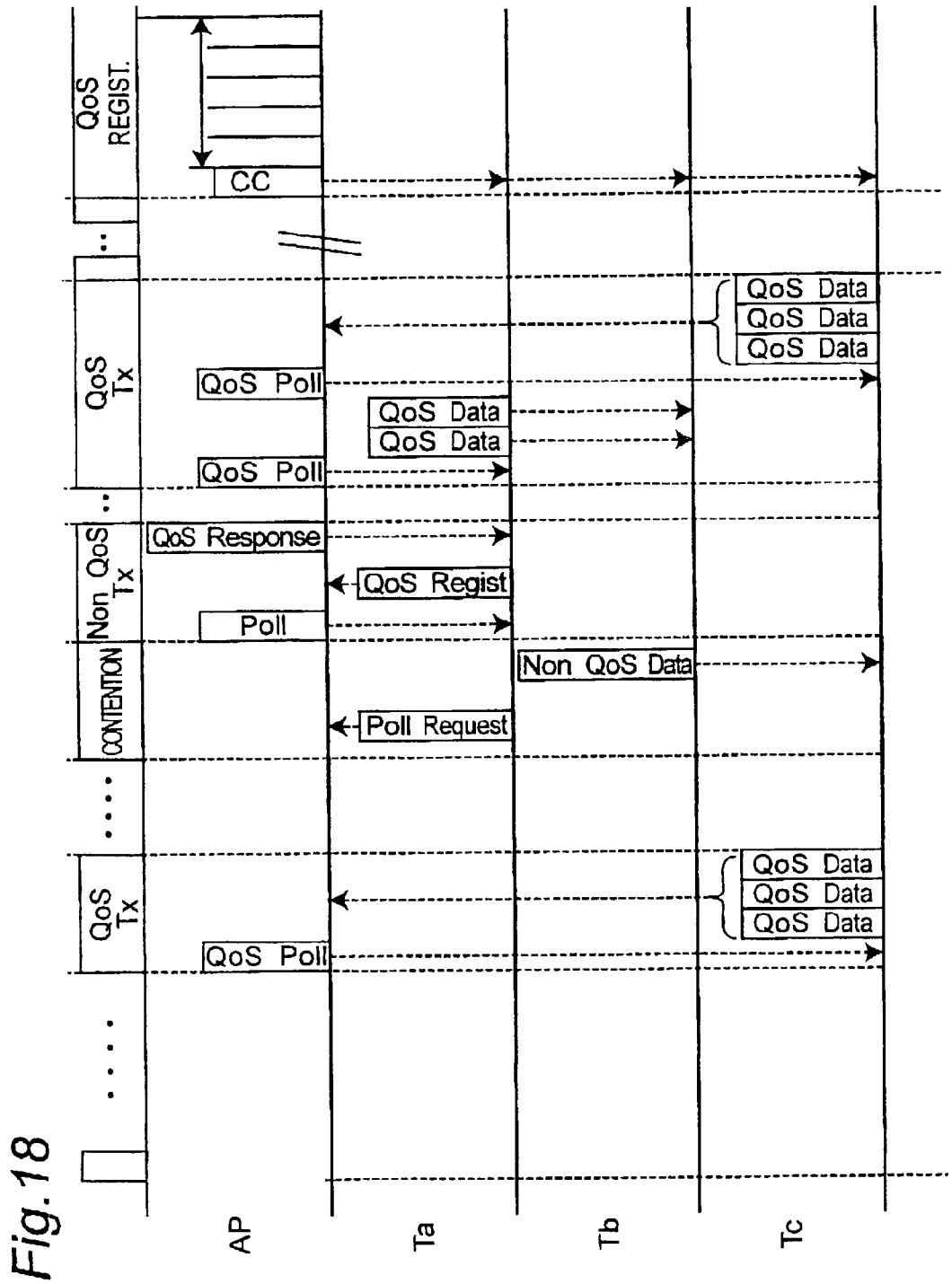
FIG. 18 is a diagram showing data transfer when QoS registration is carried out using a non-QoS poll request.

(4) QoS registration in contention-based data transmission phase without using reservation request (RR):

FIG. 17 shows a diagram that indicates data transfer when QoS registration is carried out only within a contention-based transmission phase. What differs from procedure (2) is that procedure (2) is applied when reservation request (RR) fails, whereas procedure (4) does not need to provide any contention control (CC) phase, and it does not matter whether reservation request (RR) fails or not.

Station Ta transmits QoS registration request frame ("QoS Regist." in FIG. 17) directly to access point AP. Access point AP which receives QoS registration request frame carries out processing same as that described in procedure (2), and if the request is acceptable based on a condition available for the wireless medium, access point AP registers station Ta in accordance with the QoS parameters and transmits a QoS request response frame to station Ta. After station Ta is registered, station Ta can carry out QoS transmission according to reception of QoS poll from the next QoS transmission phase.

(5) QoS registration using non-QoS poll request without using reservation request (RR):

FIG. 18 shows a diagram that indicates data transfer when QoS registration is carried out using a non-QoS poll request. What differs from procedure (3) above-mentioned is that procedure (3) is a procedure when reservation request (RR) fails, whereas procedure (5) does not need any contention control (CC) phase provided, and it does not matter whether reservation request (RR) fails or not.

Station Ta first transmits a request for non-QoS poll ("Poll Request" in FIG. 16) directly to access point AP.

Then, access point AP carries out non-QoS poll for station Ta in the subsequent non-QoS transmission phase and gives station Ta an opportunity for data transmission of non-QoS. Station Ta transmits QoS registration request frame ("QoS regist." in FIG. 18) to access point AP based on the non-QoS poll. Access point AP which received QoS registration request frame carries out the processing same as that described in procedure (2), and if the request is acceptable based on a condition available for the wireless medium, access point AP registers station Ta and the QoS parameters, and transmits the QoS request response frame to station Ta. After station Ta is registered, station Ta can carry out QoS transmission according to reception of QoS poll from the next QoS transmission phase.

Five types of procedures for carrying out QoS registration have been explained.

Figure 19:
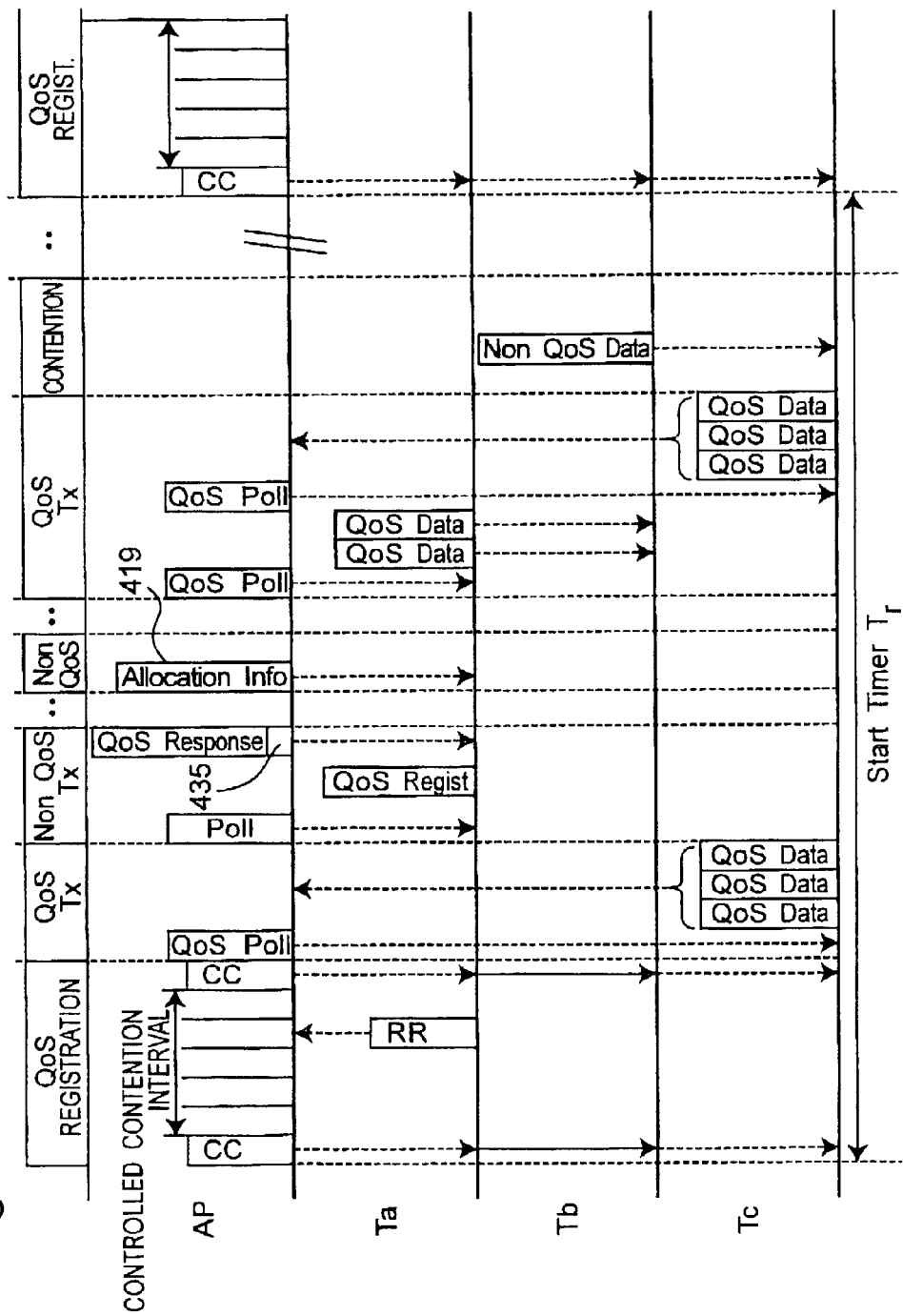
FIG. 19 is a diagram showing division of QoS request response frame into two types of frames.

In the five types of procedures described above, station Ta is designed to recognize the QoS-registration and its specific contents in accordance with QoS request response frame 417. However, in this scheme, there are cases in which problems may be caused in the event that station Ta hopes to immediately recognize whether QoS registration has been accepted or not. The reason is that since calculation load of bandwidth allocation information (423 through 431) is extremely high, it would take some time to generate the information. Therefore, as shown in FIG. 19, in the non-QoS phase of a conventional medium dedication scheme, access point AP may first transmit information 435 (FIG. 20A) that represents only permission/non-permission of QoS registration to station Ta by containing within the QoS request response frame. In such event, in the QoS request response frame, no bandwidth allocation information 419 is included. Then, access point AP may transmit bandwidth allocation information 419 to station Ta after content of bandwidth allocation information 419 are completely computed. It is possible to divide the content of QoS request response frame in this way.

Each element and operation of the present invention is fully described below.

In this section, an apparatus for controlling network resources at Layer 2 of the OSI model applied to the Wireless Network is disclosed. To help understand the invention easier, the following definitions are used:

A "packet" is a self-contained unit of data of any possible format that could be delivered on a data network.

The term "resource" basically refers to time available for using a shared wireless channel.

The term "WM" refers to the Wireless Medium.

The term "QoS" refers to Quality of Service.

The term "MAC" refers to Medium Access Controller

In the following description, for purpose of explanation, specific numbers, times, structures, and other parameters are set forth in order to provide a thorough understanding of the present invention. The following paragraphs give an exemplification of how the invention can be implemented. However, it will be apparent to anyone skilled in the art that the present invention may be practiced without these specific details.

Figure 1:
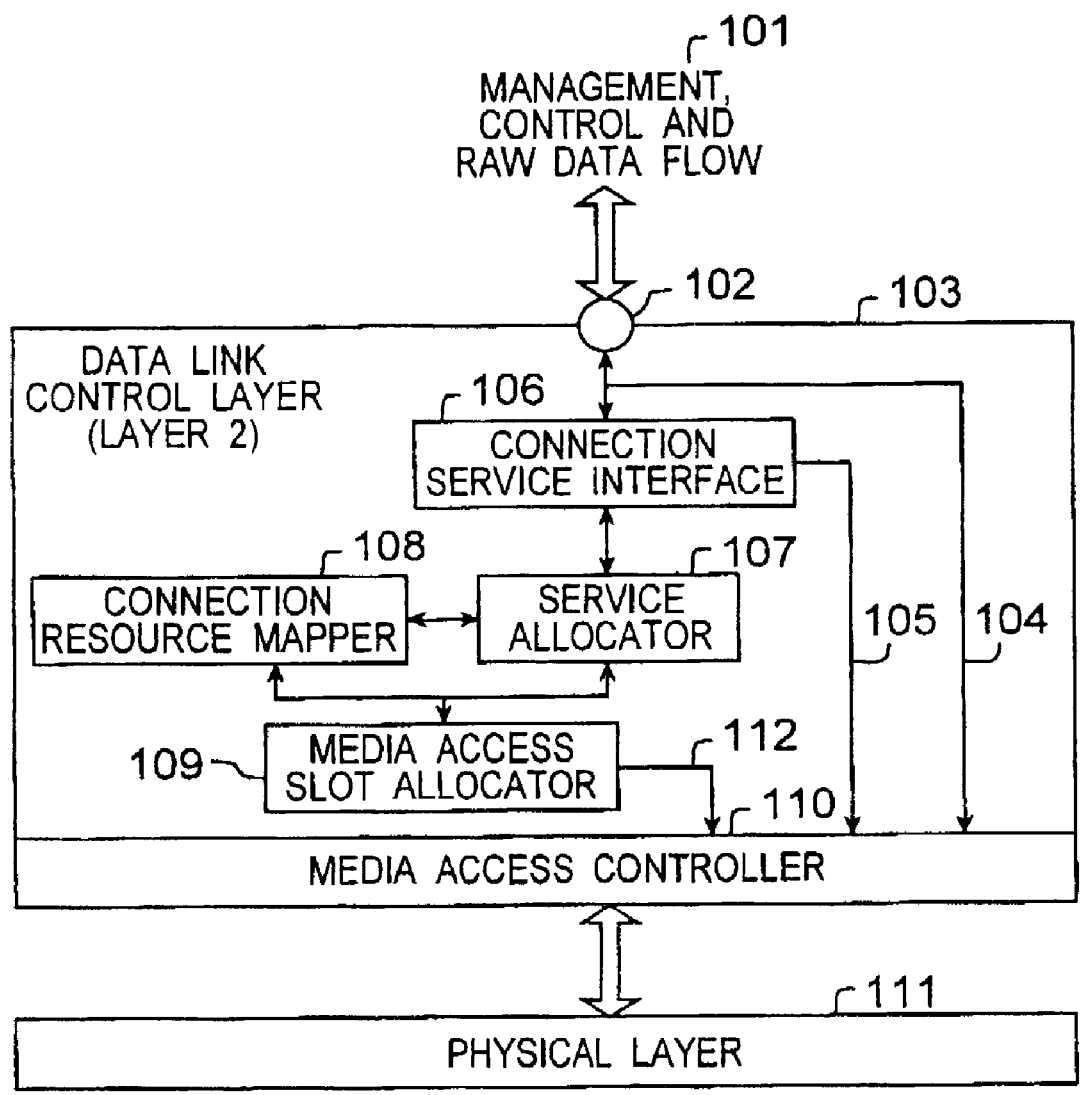
FIG. 1 is a diagram of an apparatus which schedules medium access. This figure give a depiction of the sub-components required to construct or implement the apparatus used to schedule data delivery based on connection request requirements received through Service Access Point of Layer 2 or Data Link Layer Control.

FIG. 1 gives an overall diagram of the apparatus for scheduling the access to the WM via the Medium Access Controller as marked as (111). The Medium Access Controller has a set of standardized interfaces, protocol, and data format that makes medium access possible. Both Control and Raw Data that need to be transferred out through the Physical layer need to traverse through the MAC. The MAC will then send the data to the Physical Layer and reach it's final destination through the WM. To establish a data connection for control messages arriving at the Service Access Point, as marked by literal (102), these connection requests messages are intercepted by the Connection Service Interface (106). It is at the Connection Service Interface (106), decisions are being made if the management or control messages should requires connection-oriented connections with the final destination. If control or management messages need not set up long term persistence connection, then the Connection Service Interface re-route the management and control messages to be processed by entities that perform the management frame or redirect to the MAC though data route indicated by (105). Control messages that traverse through the route (105) could also be control messages that are sent from upper layers on ad-hoc basis. Data stream that traverse on route (104) and (105) do not have rigid medium access time and is largely dependent on the MAC layer to obtain a transmission time from the WM.

Data streams that traverse from the data path (112) are data transmission that is highly coordinated in the way MAC obtains the Wireless Medium at specific time interval. The source of data streams traversing through route (112) is data streams that are time sensitive and required connection oriented connection service with a specified destinations. These data streams are passed to the Service Allocator (107) from the Connection Service Interface based on the connection request message from (102). In the Service Allocator, the tasks performed include the service level to support different data streams. It further maintained a set of data connections currently active and non-active so that the Service Allocator can signal to access medium. In the Connection Resource Mapper (108), the allocation is based on priority and the available resource that the Medium Access Slot Allocator can gather from the WM. The Medium Access Slot Allocator will provide and manage the timing information of each wireless medium access based on the data stream requirement. The time intervals for all wireless medium accesses are controlled by the Medium Access Slot Allocator (109). The detail implementation of Medium Access Slot Allocator that provides mechanism to achieve a predefined QoS level and it is illustrated in FIG. 2.

Figure 2:
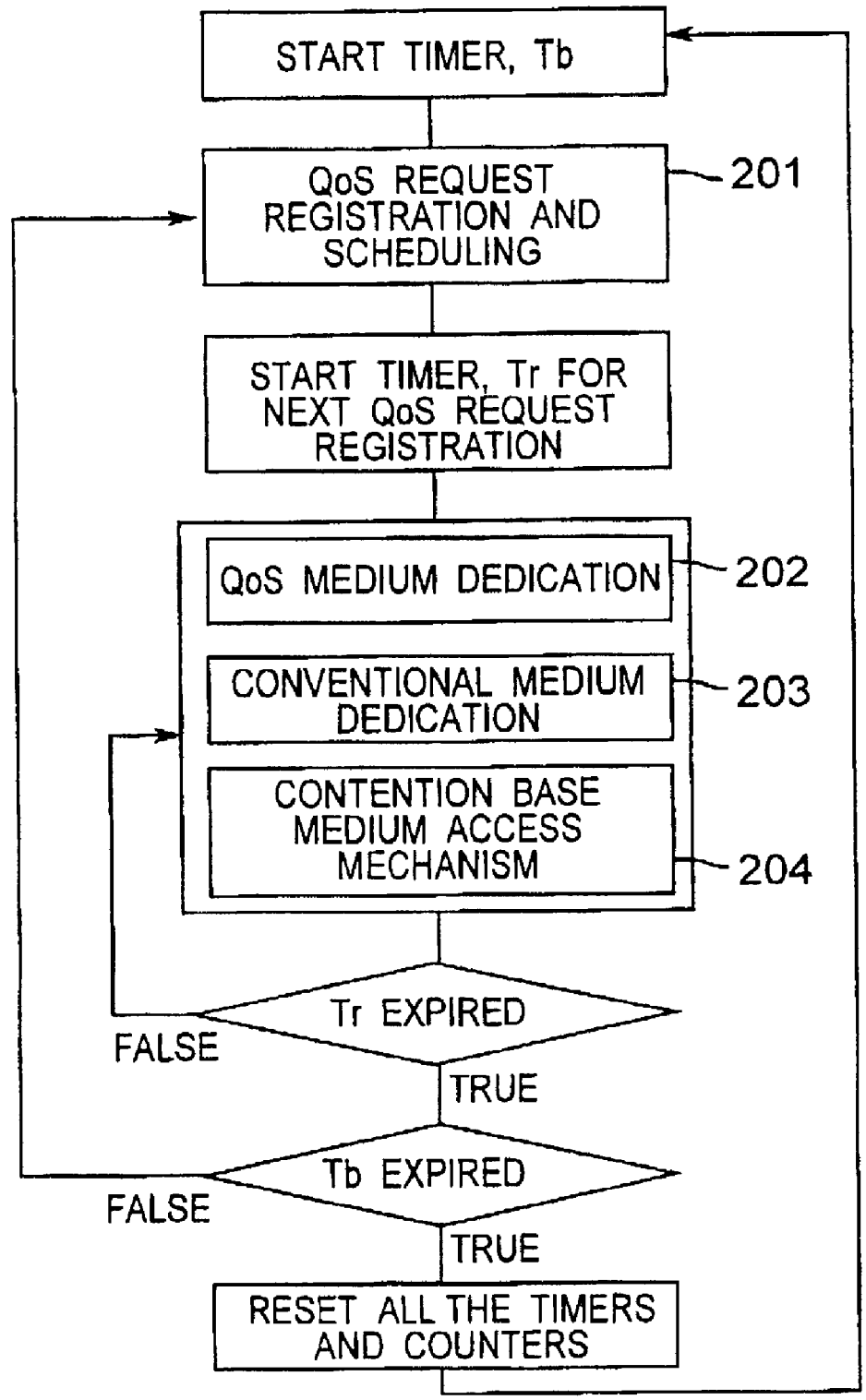
FIG. 2 is a flowchart of 3-phase medium dedication. This figure shows a process flow of 3-Phase Medium Dedication, which includes processes such as QoS Request registration, QoS Medium Dedication, Conventional Medium Dedication and Contention Base Medium Dedication.

FIG. 2 shows a mean used by wireless medium coordinator to provide QoS. To understand the operations of the QoS enables wireless medium coordinator in detail, reference is also being made to FIG. 3. The operations, which include four sub tasks, such as QoS Request Registration and Scheduling (201), QoS Medium Dedication (202), Conventional Medium Dedication (203) and Contention Base medium access mechanism (204), are being carried out by the wireless medium coordinator in repetition fashion. QoS Request Registration and Scheduling (201) and QoS Medium Dedication (202) are operations to provide QoS services in wireless medium. To register for a QoS service, the following parameter can be used for registration purpose, as shown in structure QoS_Regis_Parameter.

```
QoS_Regis_Parameter {
/* maximum bandwidth required by the registered data stream */
INTEGER Maximum_Bandwidth;
/* average bandwidth required by the registered data stream */
INTEGER Average_Bandwidth;
```

-continued

```
/* minimum bandwidth required by the registered data stream */
INTEGER Minimum_Bandwidth;
/* Maximum latency the data stream can withstand */
INTEGER Maximum_Latency;
/* Average latency the data stream can withstand */
INTEGER Average_Latency;
/* Maximum jitter allowable the data stream can withstand */
INTEGER Maximum_Jitter;
/* Average jitter allowable the data stream can withstand */
INTEGER Average_Jitter;
/* Maximum time the Maximum burst of bandwidth allowable */
INTEGER Time_MAXBandwidth;
/* Maximum time for latency allowable */
INTEGER Time_MAXLatency;
/* Fluctuation of allowable latency */
INTEGER Fluctuation_Time_Latency;
/* data packet size */
INTEGER data_packet_size
/* Minimum required interval between each medium dedication */
INTEGER Min_dedication_interval
/* Maximum required interval between each medium dedication */
INTEGER Max_dedication_interval
/* Extra bandwidth required for retransmission and non-data information such as
pre-amble, protocol overhead etc. */
INTEGER Extra_bandwidth
/* Size of data packet */
INTEGER data_packet size
}
```

FIG. 3 shows the detail relationships between the four sub tasks as mentioned above. The phase for Loop A (301) is determined by any pre-defined time interval. This pre-defined time interval can be based on the capabilities of the Wireless Network node or it is dependent on the type of real-time data the network nodes needs to deliver. Note that "network node" represents the stations and/or the access point. Within Loop A (301), the number of time QoS Request Registration and Scheduling (201) sub task is being performed and the interval for Loop B (302) are also determined by the pre-defined time interval. QoS Request Registration and Scheduling (201) is only being performed 1 time with each repetition of Loop B (302), which is repeating at least one time within each repetition of Loop A (301). Within each repetition of Loop C (303), the three sub tasks, QoS Medium Dedication (202), Conventional Medium Dedication (203) and Contention Base medium access mechanism (204), can be performed in any sequence order. A sequence (307) is considered valid if it contains at least one of the three sub tasks. Loop C is repeating at least one time within each repetition of Loop B.

During QoS Request Registration and Scheduling (201), wireless medium coordinator sends out a control frame (401) to initiate controlled contention. Controlled contention is an effective mechanism, which random backoff as in CSMA/CA mechanism is not needed to resolve collision within allocated slot and stations can immediately resume contention for the next coming slot. Note that the term "random backoff" refers to a mechanism that when a station detects that its wireless channel is in use, the station waits for the time determined based on random process theory until the station carries out next detection. The control frame (401) contains the following fields, such as criteria code (402), contention slot length (403) and contention slot duration (404). Criteria code field (402) is used by medium coordinator to specify criteria, in the form of coding, that need to be matched by wireless station recipients in order to be qualified for contending in the allocated slots. Contention slot length field (403) specifies the number of fix duration slot being allocated by medium coordinator. Contention slot duration (404) field indicates the duration time of each individual slot, It is usually set to the duration needed by recipient to transmit a response frame (405) back to medium coordinator upon receiving the control frame (401). Response frame (405) consists Medium Dedication Request Duration (406), which indicates the duration of medium dedication that the station needed to transmit QoS Registration Request frame (407). QoS Registration Request frame (407) contains fields for filling all the values in structure QoS_Regis_Parameter as mentioned above.

Figure 5:
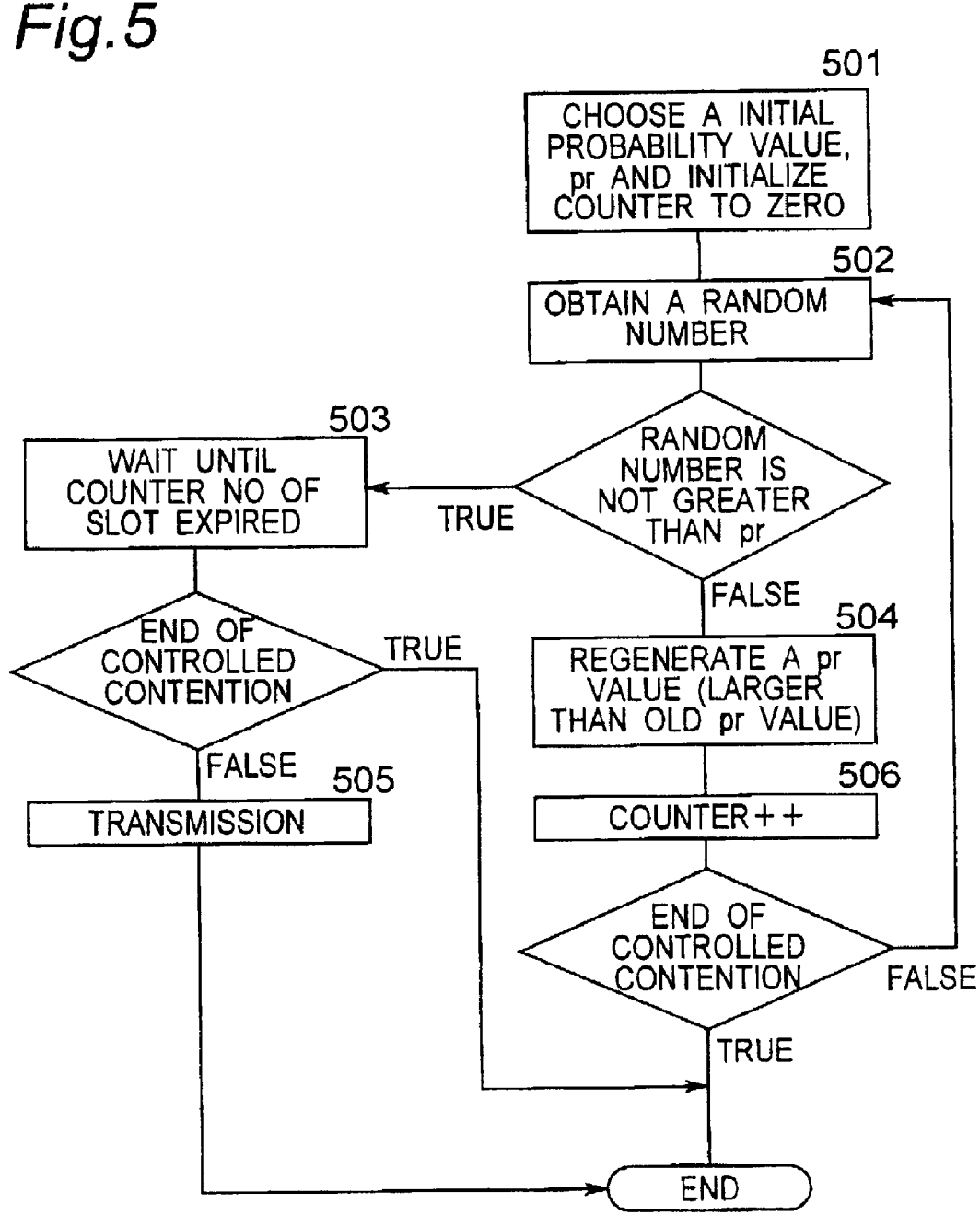
FIG. 5 is a flow chart of slot selection procedure. This figure shows a process flow for making a choice of slot that minimizes chance of collision with other stations as well as to gain high chance of successful transmission after experiencing collision.

Response frame (405) is only being transmitted when a station wants to register with medium coordinator as well as matches criteria as specified by criteria code (402) and successfully chosen a slot after performed operation in FIG. 5. Wireless station that match the criteria specified in the criteria code field can choose any slot within the allocated slot, at its own decision, to transmit. The choice objective is to minimize possibility of colliding with other station in order to achieve higher usage efficiency of the allocated slots. FIG. 5 shows a method for making such a choice:

1. Choose a probability value, pr (501). Such as 1/Contention slot length (403)
2. Performing the following steps until the slot to transmit is being determined or fail to determine a slot for transmission after considers all allocated slots.
   a. Obtain a random number (502)
   b. Jump out from the loop and go to step 3 if the random number is not greater than pr
   c. Regenerate a new pr value, which have higher chance to let a random number to be not greater than pr (504).
3. The number of time that the station choose a random number that is greater than pr in Step 2 within the current round, as indicated by a counter (506), is the number of allocated slot to skip before to transmit (503).

The following is a method used by wireless medium coordinator to determine a value for contention slot length (403) which indicates a number of slots provided for RR reception in order to provide higher usage efficiency of the slots allocated.

Medium coordinator, which initiates controlled contention, uses a pre-defined value as a starting value for contention slot length field (403). Subsequence value of contention slot length (403) is determined by referencing to the usage efficiency and number of slots experiencing collision during previous controlled contention. Such as decreasing the contention slot length if experiencing certain degree of no transmission in the previous controlled contention, or increasing the contention slot length if experiencing certain degree of collision in the previous controlled contention.

After contention control (CC) phase expires, the medium coordinator grants individual station, which its response frame (405) is being received, the requested duration of medium dedication such that QoS Request frames (407) can be transmitted to medium coordinator without going thru contention and experiencing collision, which provides higher chances of being able to deliver the frame successfully and reach the destination more timely. Traffic requirements as indicated by fields of QoS Request Frame (407) are transformed into input parameters to scheduler The functionality of scheduler is to provide a schedule of medium dedication for all accepted traffic requests such that their respective requirement can be ensured.

FIG. 6 shows the flow of operations for converting QoS reservation requests into request list, which is used as an input for scheduler (606) to generate a medium dedication schedule. The following is the explanation for the flow:

i. If QoS Reservation Request list is not empty then remove a request for processing (601) else go to step v.

ii. Transform request requirements into input parameters (602), which are needed to compute the number of medium dedication for this request, Ni (603)

a. Compute the total duration needed to transmit a packet, which contains data size=nominal MSDU size (410). Store this value into variable Di b. Compute the actual bandwidth required for the traffic transmission.

c. Compute the total duration of medium dedication needed for the traffic transmission to achieve actual bandwidth requirement within phase of Loop A. Store this value in a variable, Ti.

d. Compute the ratio of the duration of Loop A over Ti (i.e (duration of Loop A)/Ti). Store this value in a variable, Ri.

iii. Associate the parameters obtained from step ii with the request and store it into request list if the bandwidth available is less than requested (604).

iv. Go to step i.

v. Sort the request list using request priority and Ni (605)

Figure 12:
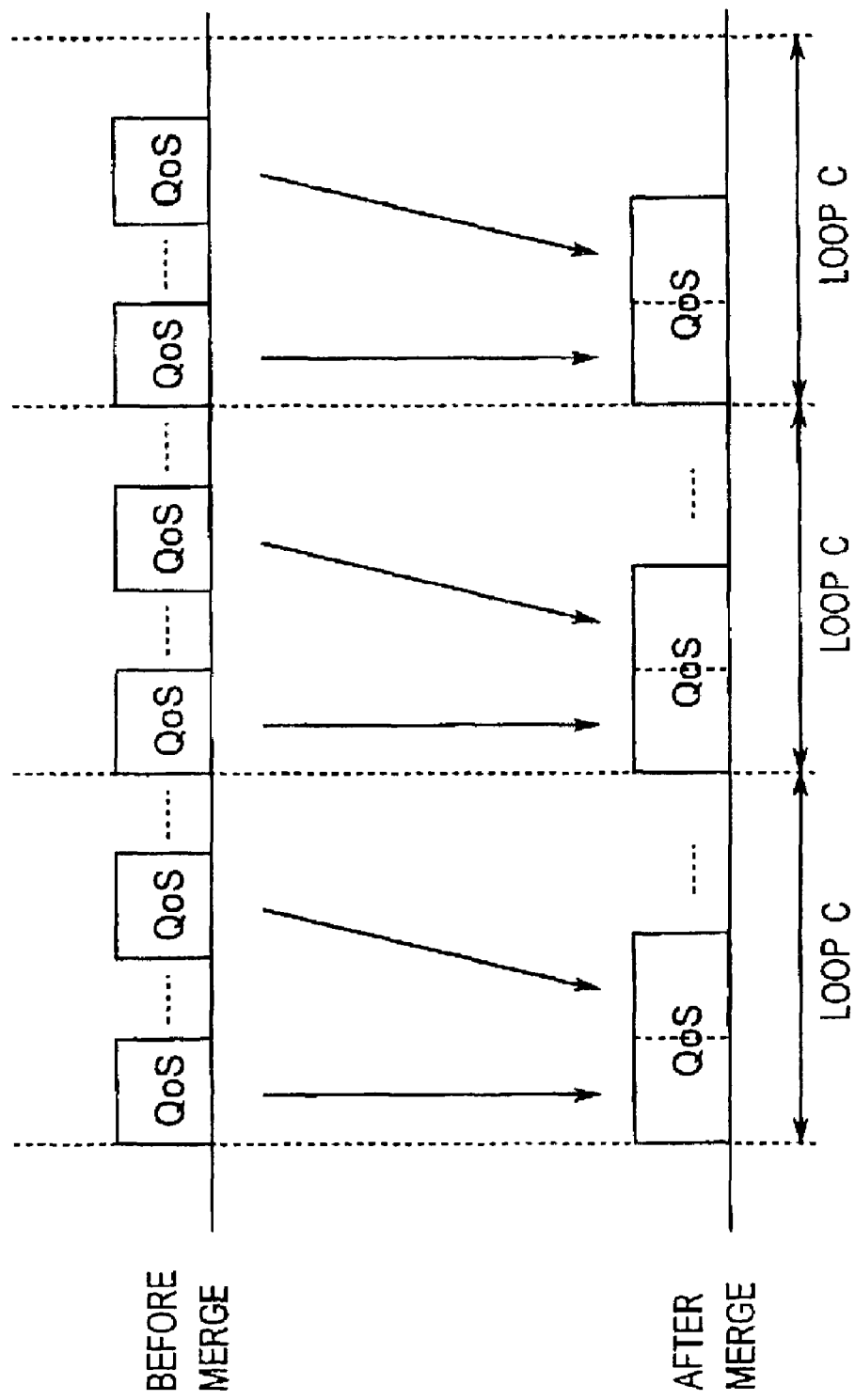
FIG. 12 is a diagram showing the flow of operations performed by scheduler to generate a schedule for medium dedication base on request list.

FIG. 12 shows the flow of operations performed by scheduler to generate a schedule for medium dedication base on request list:

For each request in request list, i:

i. Reducing the value Ni to minimum by merging multiple sequential medium dedications into a single medium dedication which having longer duration (701). It can be started from the largest duration value, which is not violating the following constraints, hereby named Constraint_List_A:

a. The duration is not greater than (polling interval/Ri) or b. Total data transmitted within a polling interval does not greater than Maximum Burst Size ii. Generate a schedule base on output from step i (702)

iii During scheduling, for the case when a medium dedication for current traffic request, hereby as Medium_Dedication_A, collide with other medium dedication being scheduled, hereby named as Medium_Dedication_B, the following operation is being performed:

a. Compute parameters needed (703):

1. Obtain the duration of Medium_Dedication_A (801). Store this value into a variable, a.

2. Obtain the duration of Medium_Dedication_B (802). Store this value into a variable, b.

3. Obtain the interval between each medium dedication of the current schedule (803). Store this value into a variable, c.

4. Compute the duration of Medium_Dedication_A that is not being collided (804). Store this value into a variable, d.

5. Set d to zero if the collision did not start at the beginning of Medium_Dedication_A.

6. Compute the duration of Medium_Dedication_A that is being collided (805). Store this value into a variable, e.

b. If d not equal to zero and $b<(d*c/a-d)$, spilt Medium_Dedication_A into few smaller medium dedication with spacing equal to $(d*c/a-d)$ (704).

c. Else, move the original starting time of Medium_Dedication_A after Medium_Dedication_B (706). If this action violates Constraint_List_A then this request is rejected and removed from the schedule.

d. Combine Medium_Dedication_A and Medium_Dedication_B (705)

If the request is acceptable as a result of scheduling, the wireless medium coordinator responds by returning QoS request response frame (417) to a requesting station. QoS request response frame (417) contains station address (418), information that indicates acceptance or rejection (435 of FIG. 20A) and possibility of direct transmission (420).

As the QoS response, the medium coordinator sends back QoS response frame (417) indicating acceptance/rejection and bandwidth allocation information frame (421) that indicates scheduling results to STA in which QoS registration is succeeded. The medium coordinator does not need only a little time to judge whether QoS registration of stations can be accepted or not. However, in order to create bandwidth allocation information (423-431), it is assumed that a certain degree of time would be required, because the generation of such information provides extremely high calculation load. Therefore, as shown in FIG. 19, QoS request response frame (417) is divided into two types of frames, that is, a frame that describes information 435 for indicating acceptance/rejection and a frame that describes specific bandwidth allocation information (419) to respond to the station, separately, as shown in FIG. 20A. Specifically, QoS response frame (417) that indicates acceptance/rejection of reception is quickly transmitted, and then bandwidth allocation information frame (421) that requires time for generation is transmitted. According to this configuration, even in the event that the information processing capacity of medium coordinator lacks, the station can learn acceptance or rejection of QoS registration and can quickly move to the next processing.

If the result from the scheduler indicates that the request is acceptable, wireless medium coordinator responds by sending a QoS request respond frame (417) back to the request station. QoS Request Respond frame (417) contains station address (418), information indicating accept or not (419) and possibility of direct transmission (420).

In Conventional Medium Dedication sub task, a wireless medium coordinator will allocate medium access duration for wireless stations based on information or request collected and network condition monitoring.

In Contention Based sub task, each wireless station contend for medium based on standard procedure and the winner will own the medium for a complete sequence of frame exchange or a specific duration, which is minimal.

According to the above-mentioned examples of the present invention, the present invention is characterized as follows:

As the first aspect of the present invention, the present invention is implemented as an apparatus to coordinate allocations of network resources and wireless medium based on resource requests received from the service access points of the network protocol layer controlling medium access to the wireless medium that comprises of the following functional entities:— i. Connection Service Interface is a functional block that intercepts upper layer network connection requests responds with appropriate grants and generate the granted service parameters;

ii. Connection Resource Mapper provides mapping of network connection request/s received from the service access point of medium access control with the parameters used in the medium access control that enables medium access;

iii. Service Allocator provides allocation of available and controlled network resource including access time and transmission speed based on the connection request received; and iv. Medium Access Slot Allocator provides scheduling the connection request and the data delivery requirement required to meet the desired service level.

In the first aspect of the invention, delivery service requested from upper network layers may be possible to be made through a single Medium access layer by specifying the type of connection required and allowing the data stream to request for 2 type of delivery services: (i) connection oriented and (ii) connectionless oriented.

As the second aspect of the present invention, the present invention is implemented as a means to emulate a connection oriented in wireless medium access network by first registering a data stream sent with the Medium Access controller based on the service level required which includes the following basic parameters:

i. Parameters or representatives for average bandwidth expressed in number of bits per second;

ii. Parameters or representatives for average bandwidth expressed in wireless medium time required in units of time over a fixed period interval;

iii. Parameters or representatives for average latency between data packets between transmitter and receiver measured at the medium access point in unit of time;

iv. Parameters or representatives for average jitter between inter-arrivals of data packets measured at the medium access point at the receiver in unit of time;

v. Parameters or representatives for the maximum bandwidth expressed in number of bits per second;

vi. Parameters or representatives for the maximum bandwidth expressed in wireless medium time required in units of time over a fixed period interval;

vii. Parameters or representatives for the maximum latency between data packets between transmitter and receiver measured at the medium access point in unit of time;

viii. Parameters or representatives for the maximum allowable jitter between inter-arrivals of data packets measured at the medium access point at the receiver in unit of time; and ix. Parameters or representatives for the minimum polling interval in unit of time;

x. Parameters or representatives for the maximum polling interval in unit of time;

xi. Parameters or representatives for the extra bandwidth required to cope with bandwidth loss due to retransmission, pre-amble, and protocol overhead.

xii. The size of data packet within each burst of transmission where each burst consists of singular or plural number of data packets.

As the third aspect of the present invention, the present invention is implemented as a means for a network node to reserve wireless medium based on the Quality of Service level required for delivering or receiving a data stream to and from the wireless medium by allocating a variable length of time slot in a period and non-periodic manner such that the service level of the data stream can be achieved based on the service level parameters received from any station or entity requesting the Quality of Service level.

As the fourth aspect of the present invention, the present invention is implemented as a means of pre-allocating medium access time to ensure deterministic medium access time and transmission time for the following type of data streams transmission:

i. Control data steams responsible for signaling, network management and critical data, ii. User data streams for transporting real-time information dynamically assigned as a result of network resource reservations that are successfully negotiated through the control streams transported in (i), iii. User data streams that do not requires Quality of Service reservation, and iv. User data streams that are not allocated medium access time as a result of full allocations in (i), (ii) and (iii).

As the fifth aspect of the present invention, the present invention is implemented as a means of enabling a dynamic allocation of time for performing Quality of Service registration of data streams with quality of service specified by parameters as described in the second aspect and scheduling, scheduled Quality of Service wireless medium access, scheduled wireless medium access for unregistered data stream, data stream contention for wireless medium access by predetermining the time boundaries for each of wireless medium access types.

As the sixth aspect of the present invention, the present invention is implemented as a method for contending for Quality of Service registration over the wireless medium such that registration can be made through a central wireless medium access controller. The method comprises the steps of:

i. Allocating 0.5 N number of wireless medium access time slots for Quality of Service data stream registration at the initial stage, where N is the total number of registered wireless stations controlled by the central wireless medium access controller, ii. Allocating additional medium access time slots based on number of collisions detected by increasing the number medium access time slots reservation length by 2 times the number of slots that are detected to have collisions, and iii. In the case of no collision slots are detected, decreasing the current number of medium access time slot reservation length by deducting from the previous allotted number or time slots by M/2, where M is the number of unused time slots in previous frame.

As the seventh aspect of the present invention, the present invention is implemented as a means for dividing wireless medium into few phases in order to provide Quality of Service for serving real-time applications and at the same time also serving non real-time applications. These phases are:

i. QoS Request Registration of data streams based on service level requested using parameters described in the second aspect and Scheduling of time for transmission of the data stream registered or admitted, ii. QoS Medium Dedication where the transmission time are allotted for the registered streams based on the requested parameters, as described in the second aspect for the stream at the central controller, iii Conventional Medium Dedication where the transmission time is predetermined and allotted for wireless station in the wireless network for data transmission, and iv. Contention Base Medium Access Mechanism where the transmission time is left to be initiated by the station in the wireless network.

In the seventh aspect of the invention, the phases are performed in repetitive manner with each repetition consists of one occurrence of QoS Request Registration and Scheduling phase and multiple occurrences of sequence of ii, iii and iv phases where a valid sequence consists at least one of the three phases mentioned.

As the eighth aspect of the present invention, the present invention is implemented as QoS Request Registration and Scheduling phase comprising of the following.

i. Controlled Contention is allowable for wireless stations intending to send reservation requests to indicate duration of medium dedication needed, and ii. Wireless Coordinator allocates medium dedication as requested by wireless stations for them to transmit reservation request such that reservation request can reach wireless coordinator in a time bound manner.

As the ninth aspect of the present invention, the present invention is implemented as a method of avoiding contention by choosing a slot during controlled contention comprising the following steps of:

i. Choose a value, 1/N, where N is equal to any arbitrary contention slot length;

ii. Determining a new random number until a successful transmission can be achieved; and iii. The number of time that the station choose a random number that is greater than 1/N in Step ii within the current round is the number of allocated slot to skip before transmitting.

In the ninth aspect of the invention, the method for determining the success of transmission within slot part (ii) comprising the following steps of:

i. Obtain probability Pr=1/N, where N is equal to arbitrary contention slot length, ii. Obtain a random number, iii. If the random number is not greater than the probability Pr obtained in step i., perform above part(iii) of the ninth aspect of the present invention, and iv. Regenerate a new Pr value, which have higher chance to let a random number to be not greater than the Pr value of step (iii).

As the tenth aspect of the present invention, the present invention is implemented as a means for generating a medium dedication schedule consists the following phases:

i. QoS Registration request conversion, and ii. Medium dedication schedule generation.

In the tenth aspect of the invention, the means of performing a QoS Request conversion as described in the above part (i) consists of the following steps:

i. Compute the number of medium dedication needed for each QoS request, and ii. Sort the request according to value obtain from step i.

In the tenth aspect of the invention, the means for computing the number of medium dedication for a request as mentioned in the above computing part (i) performs of the following steps:

i. Computing the total duration needed to transmit a packet, ii. Computing the actual bandwidth required for the request, iii. Computing the total duration of medium dedication needed by the request during a repetitive interval in order to achieve actual bandwidth requirement, iv. Computing the number of medium dedication needed, and v. Associating the value obtain from step iv with the request In the tenth aspect of the invention, the means for generating a medium dedication schedule performs of the following steps:

i. Generating a medium dedication schedule for each request by reducing the value computed from step iv of the tenth aspect to a minimum by merging multiple sequential medium dedications into a single medium dedication which having longer duration such that the constraint stated in the request will not be violated, and ii. Combining the medium dedication schedules obtain from step i into a single schedule.

As the eleventh aspect of the present invention, the present invention is implemented as a means of combining two colliding medium dedication schedules into a single schedule consists of either of the following steps:

i. Scheduling the colliding medium dedications one after another or ii. Breaking the colliding medium dedication of one of the schedule into few medium dedication with smaller duration and distribute it within the interval from the starting point of the colliding medium dedication to the starting point of next medium dedication or the end of that schedule.

As the eleventh aspect of the present invention, the present invention is implemented as a means for breaking the colliding medium dedication when combining two medium dedication schedule into a single schedule performing the following steps:

i. Obtain the duration of medium dedication in schedule A that are colliding with a medium dedication in schedule B;

ii. Obtain the duration of medium dedication in schedule B that are colliding with a medium dedication in schedule A;

iii. Obtain the duration from the starting point of the colliding medium dedication to the starting point of next medium dedication or the end of schedule A;

iv. Compute the duration for the part of the colliding medium dedication in schedule A that is not being collided;

v. Compute the duration for the part of the colliding medium dedication in schedule A that is being collided; and vi. Spilt the colliding medium dedication into few smaller medium dedication with spacing equal to (d*c/a−d).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The present disclosure relates to subject matter contained in priority Japanese Patent Application No. 2001-344347, filed on Nov. 9, 2001, the contents of which is herein expressly incorporated by reference in its entirety.

What is claimed is:

1. A method for use in a system comprising an access point and a plurality of stations, the method comprising:

periodically broadcasting a control frame, including information specifying contention slots during which a station may transmit a reservation request in contention with other stations, the periodic broadcasting being carried out by the access point;

transmitting a reservation request, which does not include information indicating a required bandwidth, from a station to the access point in the contention slots;

transmitting a permission signal from the access point, which provides a transmission opportunity for the station, in response to a successful receipt of the reservation request from the station; and transmitting a bandwidth request including the information indicating the required bandwidth, from the station to the access point, during the transmission opportunity, said bandwidth request having a data structure different from that of said reservation request.

2. The method according to claim 1, further comprising:

determining whether transmission is grantable in accordance with the required bandwidth, the determining being carried out by the access point; and transmitting a response frame to the station, including information representing whether transmission is grantable, the transmitting a response frame being carried out by the access point.

3. The method according to claim 1, wherein the information indicating the required bandwidth included in the bandwidth request is a QoS requirement for transmitting a data stream comprising at least one parameter, the at least one parameter comprising a minimum bandwidth of the data stream, an average bandwidth of the data stream, a maximum bandwidth of the data stream, a maximum latency allowable, a fluctuation of allowable latency, a data packet size, a minimum required interval between the start of two successive time periods during which the station is permitted to transmit the data stream, a maximum required interval between the staff of two successive time periods during which the station is permitted to transmit the data stream, and extra bandwidth required for at least one of a retransmission, a preamble and a protocol overhead.

4. The method according to claim 1, further comprising:

transmitting a notification frame, including information representing a list of identification numbers of respective stations, from which the reservation request is received during the at least one contention slot, the transmitting the notification frame being carried out by the access point.

5. The method according to claim 1, wherein the station transmits the bandwidth request to the access point each time the station is provided with the transmission opportunity.

6. A method for use in a system comprising an access point and a plurality of stations, the method comprising:

periodically broadcasting a control frame from an access point, including information specifying contention slots during which a station may transmit a reservation request in contention with other stations;

transmitting a reservation request, which does not include information indicating a required bandwidth, from a station to the access point at the contention slots;

transmitting a permission signal from the access point, which provides a transmission opportunity to the station in response to a successful receipt of the reservation request transmitted from the station to the access point;

transmitting a bandwidth request to the access point, including the information indicating the required bandwidth, from the station during the transmission opportunity provided by the access point, said bandwidth request having a data structure different from that of said reservation request;

transmitting a notification, including information representing a list of identification numbers of respective stations, from which the reservation request is received during the at least one contention slot, the transmitting the notification being carried out by the access point; and transmitting the bandwidth request to the access point during a contention-based phase, during which the station detects whether transmission is possible before transmitting the data stream, when an identification number of the station is not included in the list of identification numbers of the notification, the transmitting of the bandwidth request being carried out by the station.

7. A method to be carried out by an access point that is implemented in a system which includes the access point and a plurality of stations, the method comprising:

periodically broadcasting from an access point a control frame to the plurality of stations, including information specifying a contention interval during which a station can transmit a reservation request in contention with at least one other station;

receiving a reservation request, which does not include information indicating a required bandwidth, at the access point from a station in the contention interval;

transmitting a permission signal from the access point to the station, which provides a transmission opportunity for the station, in response to a successful receipt of the reservation request from the station to the access point; and receiving a bandwidth request, including the information indicating the required bandwidth, at the access point from the station during the transmission opportunity, said bandwidth request having a data structure different from that of said reservation request.

8. The method according to claim 7, wherein the access point receives the bandwidth request from the station each time the station is provided with the transmission opportunity.

9. A method to be carried out by a station that is implemented in a system comprising an access point and a plurality of stations, the method comprising:

receiving a control frame at a station, including information specifying a contention interval during which the station may transmit a reservation request in contention with at least one other station, the control frame being periodically broadcast by the access point;

transmitting a reservation request, which does not include information indicating a required bandwidth, from the station to the access point in the contention interval;

receiving a permission signal from the access point at the station, that provides a transmission opportunity, in response to a successful receipt of the reservation request transmitted from the station; and transmitting a bandwidth request, including the information indicating the required bandwidth, from the station to the access point during the transmission opportunity, said bandwidth request having a data structure different from that of said reservation request.

10. The method according to claim 9, wherein the station transmits the bandwidth request to the access point each time the station is provided with the transmission opportunity.

11. An access point for implementation in a system comprising the access point and a plurality of stations, the access point comprising:

a control frame transmitting section configured to periodically broadcast a control frame, including information specifying a contention interval in which a station, may transmit a reservation request in contention with at least one other station;

a reservation request receiving section configured to receive a reservation request, which does not include information indicating a required bandwidth, transmitted from the station in the contention interval;

a permission signal transmitting section configured to provide the station with a transmission opportunity in response to a successful receipt of the reservation request from the station; and a bandwidth request receiving section configured to receive a bandwidth request transmitted from the station during the transmission opportunity, the bandwidth request including the information indicating the required bandwidth, said bandwidth request having a data structure different from that of said reservation request.

12. The access point according to claim 11, wherein the information indicating the required bandwidth included in the bandwidth request is a QoS requirement for transmitting a data stream comprising at least one parameter, the at least one parameter comprising a minimum bandwidth of the data stream, an average bandwidth of the data stream, a maximum bandwidth of the data stream, a maximum latency allowable, a fluctuation of allowable latency, a data packet size, a minimum required interval between the start of two successive time periods during which the station is permitted to transmit the data stream, a maximum required interval between the start of two successive time periods during which the station is permitted to transmit the data stream, and extra bandwidth required for at least one of a retransmission, a preamble and a protocol overhead.

13. The access point according to claim 11, wherein the bandwidth request receiving section is configured to receive the bandwidth request from the station each time the station is provided with the transmission opportunity.

14. A station for implementation in a system comprising an access point and a plurality of stations, the station comprising:

a control frame receiving section configured to receive a control frame periodically broadcast by the access point, the control frame including information specifying a contention interval during which the station may transmit a reservation request in contention with at least one other station;

a reservation request transmitting section configured to transmit a reservation request, which does not include information indicating a required bandwidth, to the access point in the contention interval;

a permission signal receiving section configured to receive a permission signal which gives a transmission opportunity provided by the access point in response to a successful receipt of the reservation request transmitted from the station; and a bandwidth request transmitting section configured to transmit a bandwidth request, including the information indicating the required bandwidth, to the access point during the transmission opportunity provided by the access point, said bandwidth request having a data structure different from that of said reservation request.

15. A station according to claim 14, wherein the information indicating the required bandwidth included in the bandwidth request is a QoS requirement for transmitting a data stream comprising at least one parameter, the at least one parameter comprising a minimum bandwidth of the data stream, an average bandwidth of the data stream, a maximum bandwidth of the data stream, a maximum latency allowable, a fluctuation of allowable latency, a data packet size, a minimum required interval between the start of two successive time periods during which the station is permitted to transmit the data stream, a maximum required interval between the start of two successive time periods during which the station is permitted to transmit the data stream, and extra bandwidth required for at least one of a retransmission, a preamble and a protocol overhead.

16. The station according to claim 14, wherein the bandwidth request transmitting section is configured to transmit the bandwidth request to the access point each time the permission signal receiving section is provided with the permission signal, representing the transmission opportunity.

* * * * *

UNITED STATES PATENT AND TRADEMARK OFFICE
CERTIFICATE OF CORRECTION

PATENT NO. : 7,499,425 B2 Page 1 of 1
APPLICATION NO. : 10/290185
DATED : March 3, 2009
INVENTOR(S) : Pek Yew Tan et al.

It is certified that error appears in the above-identified patent and that said Letters Patent is hereby corrected as shown below:

Title Page;
    On the front page of the patent, at "(12) United States Patent", "Yew et al." should be --Tan et al.--.

On the front page of the patent, at "(75) Inventors", "Tan Pek Yew" should be --Pek Yew Tan--.

At column 21, line 32 (claim 3, line 12) of the printed patent, "staff" should be --start--.

Signed and Sealed this

First Day of September, 2009

David J. Kappos
*Director of the United States Patent and Trademark Office*